United States Patent
Krishnamoorthy et al.

(10) Patent No.: US 10,938,224 B2
(45) Date of Patent: Mar. 2, 2021

(54) HARDWARE/SOFTWARE RECONFIGURABLE, INTELLIGENT AND VERSATILE ELECTRICAL ENERGY PROVISIONING SYSTEM FOR ON-GRID AND OFF-GRID APPLICATIONS

(71) Applicant: HELION CONCEPTS, INC., San Jose, CA (US)

(72) Inventors: Sudarshan Krishnamoorthy, San Jose, CA (US); Indradeep Ghosh, San Jose, CA (US)

(73) Assignee: HELION CONCEPTS, INC., San Jose, CA (US)

( * ) Notice: Subject to any disclaimer, the term of this patent is extended or adjusted under 35 U.S.C. 154(b) by 617 days.

(21) Appl. No.: 15/678,783

(22) Filed: Aug. 16, 2017

(65) Prior Publication Data

US 2018/0054070 A1   Feb. 22, 2018

Related U.S. Application Data

(60) Provisional application No. 62/375,677, filed on Aug. 16, 2016.

(51) Int. Cl.
| | | |
|---|---|---|
| *H02J 7/00* | (2006.01) | |
| *H01M 10/48* | (2006.01) | |
| *H02J 7/02* | (2016.01) | |
| *H02J 9/06* | (2006.01) | |

(52) U.S. Cl.
CPC .......... *H02J 7/0021* (2013.01); *H01M 10/48* (2013.01); *H02J 7/0022* (2013.01); *H02J 7/0027* (2013.01); *H02J 7/0068* (2013.01); *H02J 7/02* (2013.01); *H02J 9/061* (2013.01); *Y02B 10/70* (2013.01)

(58) Field of Classification Search
CPC ............................ H02J 7/0021; H01M 10/48
See application file for complete search history.

(56) References Cited

U.S. PATENT DOCUMENTS

| | | | |
|---|---|---|---|
| 5,929,538 A * | 7/1999 | O'Sullivan ........... | H02J 7/1415 307/44 |
| 10,424,945 B2 * | 9/2019 | Yoo ........................... | H02J 7/02 |
| 2002/0004915 A1 * | 1/2002 | Fung ..................... | G06F 1/3203 713/320 |

(Continued)

FOREIGN PATENT DOCUMENTS

WO       2014076446 A1     5/2014

OTHER PUBLICATIONS

Nayar et al., "A Solar/Mains/Diesel Hybrid Uninterrupted Power System—A Project Implemented in India," Centre for Renewable Energy Systems Technology Australia (CRESTA), pp. 1-7, 1997.

(Continued)

*Primary Examiner* — Lisa E Peters
(74) *Attorney, Agent, or Firm* — Seager, Tufte & Wickhem LLP

(57) ABSTRACT

An electrical energy storage system that can store both grid-based electrical power when electricity prices are low or renewable power generated on-site. It can release the stored electricity for consumer applications when necessary based on a software program and configuration. The system may be networked. The system comprises a port for receiving a central processing unit (CPU), and facilitates the use of different CPU products for different users and uses.

19 Claims, 15 Drawing Sheets

(56) References Cited

U.S. PATENT DOCUMENTS

| | | | |
|---|---|---|---|
| 2003/0167105 A1* | 9/2003 | Colborn | H02J 3/005 700/295 |
| 2004/0053082 A1* | 3/2004 | McCluskey | H01M 16/003 429/9 |
| 2009/0152947 A1* | 6/2009 | Wang | H02J 1/14 307/24 |
| 2009/0189445 A1* | 7/2009 | Strizki | H02J 3/382 307/21 |
| 2011/0144816 A1 | 6/2011 | Morjaria et al. | |
| 2011/0187197 A1* | 8/2011 | Moth | H02J 9/062 307/66 |
| 2011/0265506 A1* | 11/2011 | Alston | B60H 1/00378 62/228.3 |
| 2011/0307110 A1* | 12/2011 | Sharma | G06F 1/26 700/291 |
| 2012/0089261 A1* | 4/2012 | Kim | H02J 13/0062 700/286 |
| 2012/0096294 A1* | 4/2012 | Senba | G06F 1/263 713/323 |
| 2012/0197452 A1* | 8/2012 | Matthews | H02J 3/008 700/292 |
| 2013/0024042 A1* | 1/2013 | Asghari | H02J 3/381 700/295 |
| 2013/0035802 A1* | 2/2013 | Khaitan | G06F 1/263 700/297 |
| 2013/0212410 A1 | 8/2013 | Li et al. | |
| 2014/0139191 A1* | 5/2014 | Asghari | H01M 10/48 320/134 |
| 2014/0229030 A1 | 8/2014 | Hardin | |
| 2014/0292081 A1* | 10/2014 | Long | H02M 3/156 307/24 |
| 2015/0171662 A1* | 6/2015 | Lathrop | H02J 9/066 307/64 |
| 2017/0005515 A1* | 1/2017 | Sanders | H02J 3/381 |
| 2017/0025891 A1* | 1/2017 | Kim | H02J 9/061 |
| 2017/0228003 A1* | 8/2017 | Brewer | G06F 1/266 |
| 2017/0237259 A1* | 8/2017 | Yoon | H02J 3/28 307/20 |

OTHER PUBLICATIONS

Khare et al., "Solar-Wind Hybrid Renewable Energy System: A Review," Renewable and Sustainable Energy Reviews, 58: 23-33, 2016.

Svarc, "What is a Hybrid Solar System?" Clean Energy Reviews, pp. 1-6, date accessed Aug. 11, 2016.

International Search Report and Written Opinion dated Nov. 23, 2017 for International Application No. PCT/US2017/047165.

* cited by examiner

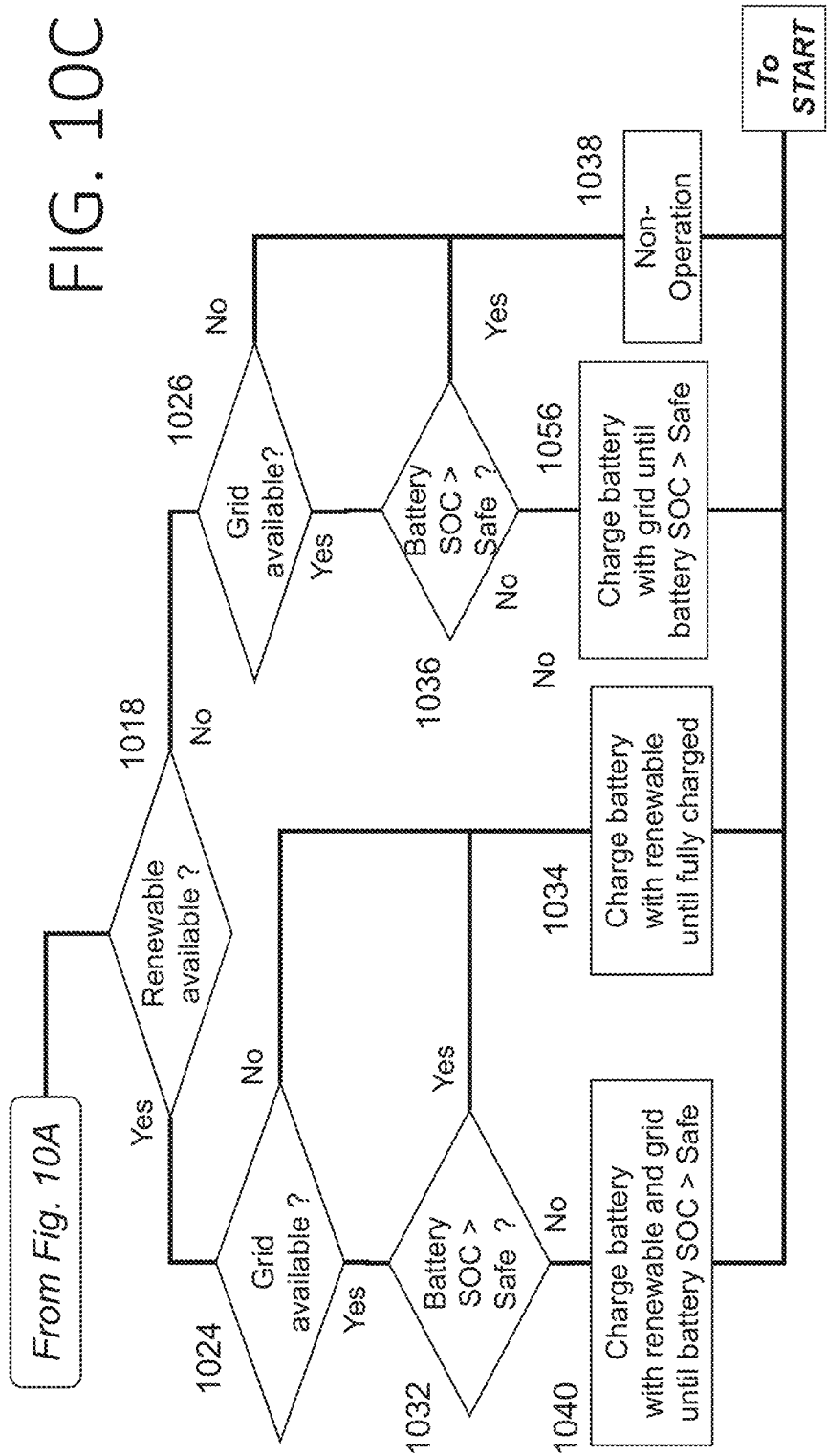

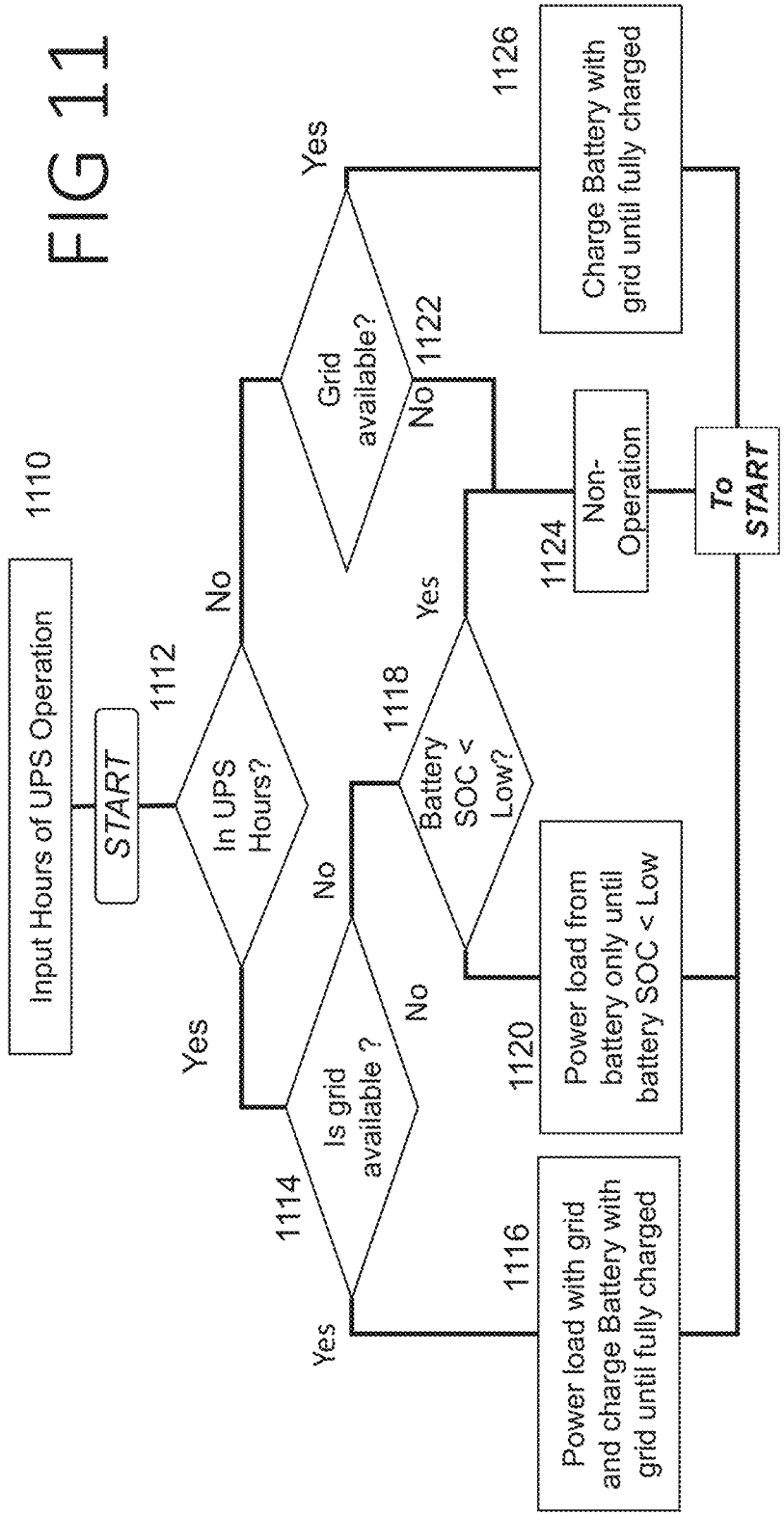

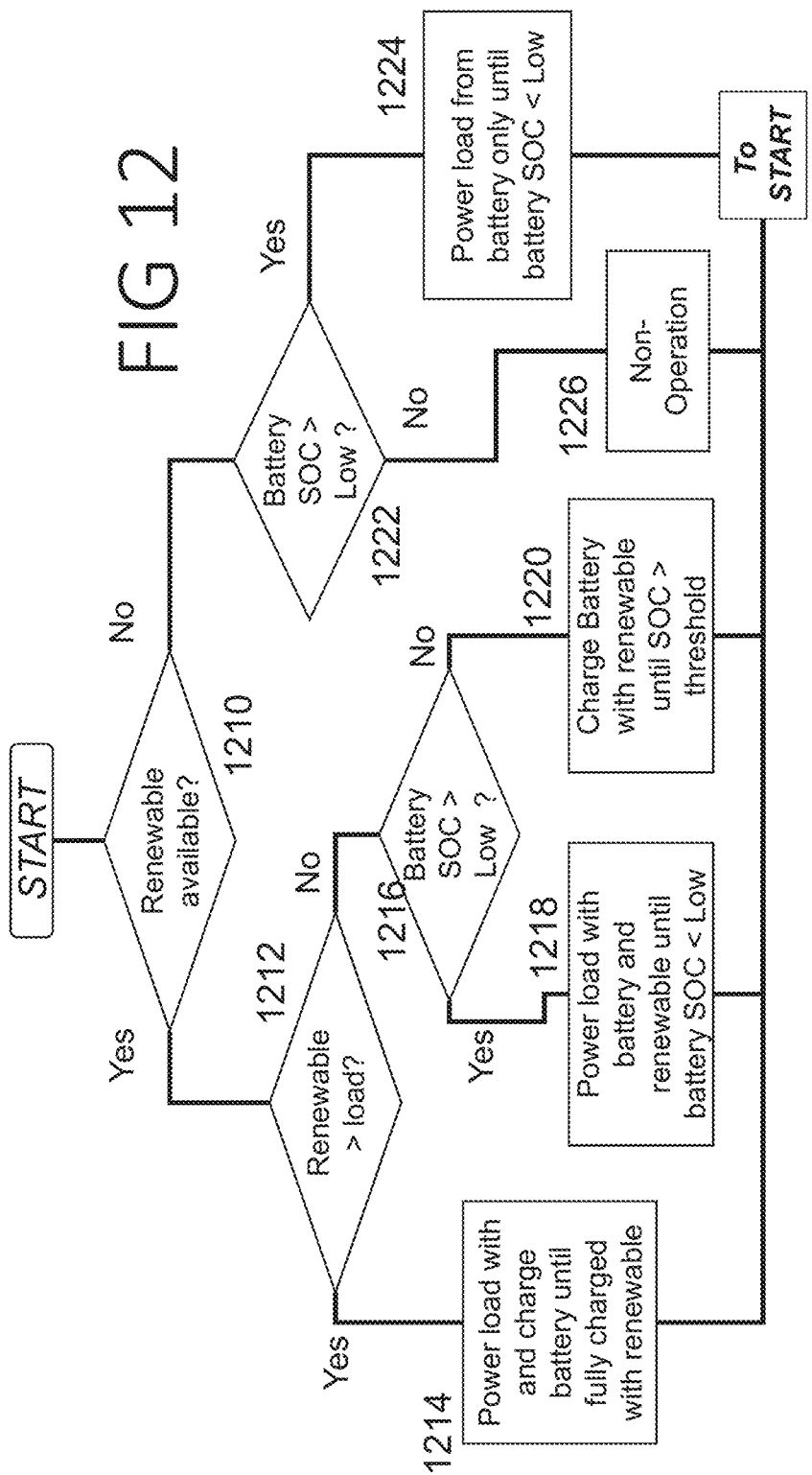

HARDWARE/SOFTWARE RECONFIGURABLE, INTELLIGENT AND VERSATILE ELECTRICAL ENERGY PROVISIONING SYSTEM FOR ON-GRID AND OFF-GRID APPLICATIONS

CROSS REFERENCE TO RELATED APPLICATIONS

The present application claims the benefit of and priority to U.S. Provisional Patent Application Ser. No. 62/375,677, filed Aug. 16, 2016 and titled SOFTWARE RECONFIGURABLE INTELLIGENT AND VERSATILE ELECTRICAL ENERGY STORAGE AND SUPPLY DEVICE FOR ON-GRID AND OFF-GRID APPLICATIONS, the disclosure of which is incorporated herein by reference.

BACKGROUND

The present invention relates to methods and systems for storing and using electrical energy in an intelligent and configurable way that provides maximum reliability and cost benefits to the consumer. Storage of electrical energy through various systems like batteries is well known technology. For example, electrical power obtained from the electrical grid may be stored for utilization in the event of grid failure in systems such as the UPS (uninterruptable power supply). In some applications, excess electrical energy produced during time of low grid demand can be stored for later use when the grid electricity demand is high. This can result is energy cost saving for the consumer as the cost of electricity tends to be higher during times of high demand.

With the availability of cheap renewable electricity generators to consumers such as solar or wind based electricity generation, an additional complexity has been added as now the consumer may choose to store power from a renewable energy source for later use, rather than only storing grid energy. However, renewable energy is intermittent in nature and its availability is often not controlled by the consumer. So situations might arise when the consumer has high demand for electricity but there is not enough renewable power to meet consumer demands. Also there is substantial upfront cost involved in the setting up the renewable electricity generation and storage equipment. This leads to some complex optimization problems for a consumer whereby he has the choice to use to grid electricity or renewable electricity or stored electricity. He also has the option of storing or not storing the grid electricity depending on its price at some particular time of the day. Finally, he needs to ensure continuous supply of electricity in case there is a grid failure or in some situations where grid electricity is not even available.

SUMMARY

The present invention provides a hardware and software reconfigurable system and method for storing and supplying electrical energy to a consumer based on various external constraints arising from the availability of renewable electricity, utility electricity rates, and stability of the electrical grid. The goal of the system is to reduce the cost of the electrical energy used by the consumer as well as to stabilize the quality or quantity of electrical power that is available. Since there is an up-front cost to be paid for the system, the payback period will vary based on the sophistication and functionality of the system.

In some examples, a field swappable hardware facilitates reconfiguration of the system. Such field modification can be used to optimize the cost of the system based on the preference and needs of the customer. For example, a central processing unit CPU for the system can be swapped or selected between a least cost, simplest implementation and more sophisticated, higher cost and capability devices. For example, a passive logic hardware system may use fairly simple comparators and logic blocks to compare various values (available power from multiple sources, stored battery level, and load demands) and establish a configuration. A more sophisticated tier of the CPU may comprise a microcontroller that uses trend and historical data to provide more optimized system control, for example, referencing a clock and load data to estimate grid power cost when determining whether to operate in a storage mode that places power from the grid onto a battery or not. A still further sophisticated tier of the CPU may also access data via an internet connection such as by broadband or cellular connection to obtain real time data for grid pricing or forecasts for weather that may aid in assessing likely near-term renewable energy availability and/or load demands. Such tiering may allow a single base station with a swappable CPU to service users in various environments including users in environments where power uncertainty (poor quality or off-grid use) is the concern as well as users in secure power environments, for whom cost reduction may be the primary aim.

In accordance with one aspect of the invention the system takes as input electrical power generated from on-site renewable electricity generators as well as grid electricity. The system can then output low cost, continuous, stable electrical power that is rated based on the hardware capability of the system. The system comprises a storage battery, one or more AC to DC and/or DC to DC charge controllers that can be used to charge the battery with either grid power or renewable energy, and a DC to AC inverter that is used to convert the stored battery energy for power useable by, for example, home appliances.

In addition, the system includes a networked and programmable electrical transfer switch that intelligently configures the system according to the use case, the time of day, and the energy availability from the different resources. In another aspect of the invention the system may be configured to work under different external circumstances. It can be configured as an electrical energy cost optimization system that stores and supplies renewable energy to the consumer under a 100% stable electrical grid. It can be further configured to act an uninterruptable power supply to stabilize electrical power used by the consumer under an unstable grid. In such a scenario, the system can operate with or without renewable energy generation. The system can be configured to act as an electrical power supply using only renewable electricity in a complete off-grid situation if no electrical grid is available. Thus the system can operate under any situation of 100% stable electrical grid to no electrical grid availability and 100% renewable power to no renewable power while optimizing the cost of the electrical energy used by the consumer and ensuring stability of the electrical power output.

The system is also capable of receiving demand response signals from the utility grid and switching to a grid power saving mode when grid electricity demand is very high. The main controller or brain of the system is used to route the power from different sources based on different optimization criterion. This controller can be extremely sophisticated using multiple microprocessors that communicates with a cloud based data analytical engine or it can be as simple as an operational amplifier comparator running a differential circuit. The system is so designed that this main controller is field swappable leading to various versions of the system at different cost points for the customer. This hardware reconfiguration leads to system cost optimization based on customer preference.

A first illustrative, non-limiting example takes the form of a hardware/software reconfigurable power supply management system comprising a base station comprising: a plurality of inputs for receiving electricity including at least a first input configured to receive grid power and at least one second input for receiving power from a non-grid source; at least one output for providing output electricity; a rechargeable battery for storing electrical power; a first converter for converting electricity received from the inputs for storage in the battery; a second converter for converting electricity stored in the battery for use at the at least one output; and a port for receiving a central processing unit (CPU) for the base station, wherein the port facilitates removal and replacement of the CPU by a user.

A second illustrative, non-limiting example takes the form of a hardware/software reconfigurable power supply management system comprising a base station comprising: a plurality of inputs for receiving electricity including at least a first input configured to receive grid power and at least one second input for receiving power from a non-grid source; at least one output for providing output electricity; a terminal for coupling to a rechargeable battery for storing electrical power; a first converter for converting electricity received from the inputs for storage in an associated rechargeable battery; a second converter for converting electricity stored in the battery for use at the associated rechargeable battery; and a port for receiving a central processing unit (CPU) for the base station, wherein the port facilitates removal and replacement of the CPU by a user.

Additionally or alternatively to either of the first or second illustrative, non-limiting examples, the system may further comprise at least a first CPU and a second CPU, the first CPU including a microcontroller and the second CPU omitting a microcontroller.

Additionally or alternatively to either of the first or second illustrative, non-limiting examples, the system may further comprise at least a first CPU including a microcontroller.

Additionally or alternatively to either of the first or second illustrative, non-limiting examples, the system may further comprise at least a first CPU omitting a microcontroller.

Additionally or alternatively to either of the first or second illustrative, non-limiting examples, the system may further comprise a first CPU adapted to monitor status of the rechargeable battery, power supply at the at least first and second inputs, and demand at the at least one output, and manage power using only the battery, power supply and demand statuses; and a second CPU adapted to monitor status of the rechargeable battery, power supply at the at least first and second inputs, and demand at the at least one output, as well as at least one of historical use patterns, and time of day, and to manage power using the battery, power supply and demand statuses in addition to at least one of historical use patterns and time of day.

Additionally or alternatively to either of the first or second illustrative, non-limiting examples, the system may further comprise a first CPU adapted to monitor status of the rechargeable battery, power supply at the at least first and second inputs, and demand at the at least one output, and manage power using only the battery, power supply and demand statuses; and a second CPU adapted to monitor status of the rechargeable battery, power supply at the at least first and second inputs, and demand at the at least one output, as well as to obtain data from at least one remote source related to at least one of grid power pricing and/or weather, and to manage power using the battery, power supply and demand statuses in addition to data from the at least one remote source.

Additionally or alternatively to either of the first or second illustrative, non-limiting examples, the system may further comprise a first CPU adapted to monitor status of the rechargeable battery, power supply at the at least first and second inputs, and demand at the at least one output, as well as at least one of historical use patterns, and time of day, and to manage power using the battery, power supply and demand statuses in addition to at least one of historical use patterns and time of day; and a second CPU adapted to monitor status of the rechargeable battery, power supply at the at least first and second inputs, and demand at the at least one output, as well as to obtain data from at least one remote source related to at least one of grid power pricing and/or weather, and to manage power using the battery, power supply and demand statuses in addition to data from the at least one remote source.

Additionally or alternatively to either of the first or second illustrative, non-limiting examples, the system may further comprise a first CPU adapted to monitor status of the rechargeable battery, power supply at the at least first and second inputs, and demand at the at least one output, and manage power using only the battery, power supply and demand statuses; a second CPU adapted to monitor status of the rechargeable battery, power supply at the at least first and second inputs, and demand at the at least one output, as well as at least one of historical use patterns, and time of day, and to manage power using the battery, power supply and demand statuses in addition to at least one of historical use patterns and time of day; and a third CPU adapted to monitor status of the rechargeable battery, power supply at the at least first and second inputs, and demand at the at least one output, as well as to obtain data from at least one remote source related to at least one of grid power pricing and/or weather, and to manage power using the battery, power supply and demand statuses in addition to data from the at least one remote source.

Additionally or alternatively to either of the first or second illustrative, non-limiting examples, the at least one second input comprises an input for receiving power from a wind source.

Additionally or alternatively to either of the first or second illustrative, non-limiting examples, the at least one second input comprises an input for receiving power from a solar source.

Additionally or alternatively to either of the first or second illustrative, non-limiting examples, the system may further comprise a CPU adapted to operate the system without a grid source.

Additionally or alternatively to either of the first or second illustrative, non-limiting examples, the system may further comprise a CPU adapted to operate the system with only a grid source.

Additionally or alternatively to either of the first or second illustrative, non-limiting examples, the port may be configured to couple a CPU to one or more relays interconnecting one or more of the inputs, battery, and at least one output, and one or more sensors coupled to one or more of the inputs, battery, and at least one output.

Additionally or alternatively to either of the first or second illustrative, non-limiting examples, the system may further comprise a communication circuit for receiving a demand response signal from a utility, and further comprising a CPU responsive to the demand response communication circuit to adapt power usage to preferentially switch from using grid power to using a renewable power source or the rechargeable battery.

Additionally or alternatively to either of the first or second illustrative, non-limiting examples, the system may further comprise a CPU adapted to perform in at least two modes, the two modes comprising an energy saver mode and an uninterruptible power supply mode.

Additionally or alternatively to either of the first or second illustrative, non-limiting examples, the system may further comprise a first CPU adapted to perform in an energy saver mode and a second CPU adapted to perform in an uninterruptible power supply mode.

A third illustrative, non-limiting example takes the form of a hardware/software reconfigurable power supply management system comprising: a plurality of inputs for receiving electricity including at least a first input configured to receive grid power and at least one second input for receiving power from a non-grid source; at least one output for providing output electricity; a rechargeable battery for storing electrical power; a first converter for converting electricity received from the inputs for storage in the battery; a second converter for converting electricity stored in the battery for use at the at least one output; control circuitry including a programmable switch for controlling operations, the control circuitry configured to determine the following variables: a demand on the output; a capacity of input power on the first input and the second input; and a state of charge of the battery; wherein the control circuitry is configured to operate as follows: the control circuitry determines whether power is available at the second input; if power is available at the second input, the control circuitry determines whether the capacity of input power at the second input exceeds the demand on the output and: if the second input power capacity exceeds the demand on the output, the control circuitry allows the second input to power the output and charge the battery; if the second input power capacity does not exceed the demand on the output, the control circuitry determines whether the capacity of the battery is above a minimum discharge capacity and: if the battery capacity is above the minimum discharge capacity, the control circuitry allows the second input and the battery to power the output until the battery reaches the minimum discharge capacity; or if the battery capacity is not above the minimum discharge capacity, the control circuitry obtains power from each of the first and second inputs to power the output; if power is not available at the second input, the control circuitry determines whether the capacity of the battery is above a minimum discharge capacity and: if the capacity of the battery is above the minimum discharge capacity, the control circuitry obtains power from only the battery to power the output until the battery reaches the minimum discharge capacity; and if the capacity of the battery is not above the minimum discharge capacity, the control circuitry obtains power from only the first input to power the output.

Many of the attendant features of this invention will be more readily appreciated as the same becomes better understood by reference to the following detailed description considered in connection with the accompanying drawings.

BRIEF DESCRIPTION OF DRAWINGS

FIGS. 10A-10C illustrate one embodiment of the flow diagram of the system operation when operating as an uninterruptable power supply with availability of on-site renewable electricity generator;

FIG. 11 illustrates one embodiment of the flow diagram of the system operation when operating as an uninterruptable power supply without the availability of on-site renewable electricity generator;

FIG. 12 illustrates one embodiment of the flow diagram of the system operation when operating as complete off-grid system where no electrical grid is available.

DETAILED DESCRIPTION

Figure 1:
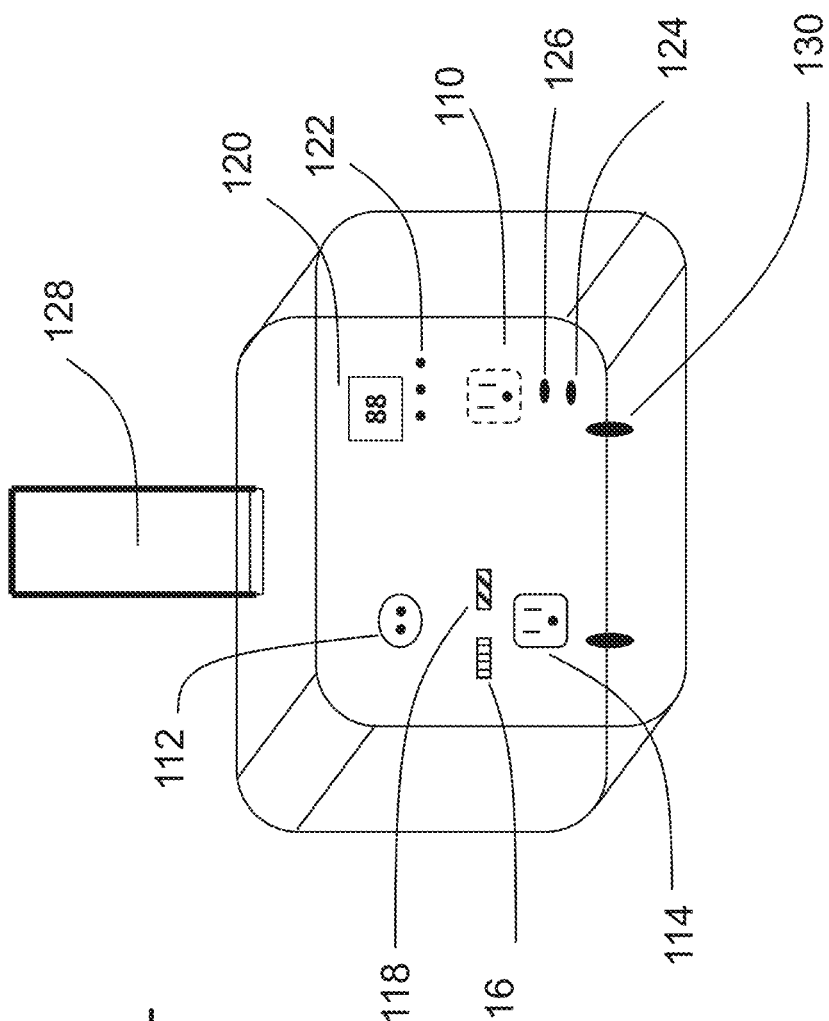
FIG. 1 illustrates one embodiment of the external view of the system with its inputs, outputs and status displays.

FIG. 1 illustrates an external view of one embodiment of the of electrical energy storage and supply system of the present invention. It has two inputs and one output. The inputs are grid electricity if available which is either 120V or 220V AC [110], and one or more renewable electricity sources [112], such as solar panels or wind turbines, for example.

The output of the system [114] is grid compatible electricity, for example, 120V or 220V AC, from which any household appliance can run. The "grid compatible" electricity output may be tailored to a given geography. The output capacity will depend on the capacity of the components chosen inside the system. In some examples, a range of 100 watts to 200 watts of steady power can supply the target loads with surge capacity of 1 to 2 kilowatts. The output wattage can be substantially increased by altering the capacities of the components, such as the inverters, inside the system. The on/off switch in the front turns the system and the output power on or off and can also be used to reset the system for reconfiguration.

In an illustrative example, the system may include status indicators to inform the consumer regarding the working of the system, such as by having LED indicators to indicate the status of power generation. For example, the LED [116] on top of the output socket indicates that the system is outputting renewable power or stored battery power whereas the LED [118] indicates that the system is outputting grid power. The Battery State-of-charge (SOC) indicator [120] indicates the level of charge in the battery as percentage. In an example, 0% would mean that the battery is fully discharged whereas 99% would mean the battery is almost completely charged. The battery charging source may be indicated with 3 LEDs [122]. For example, a green LED may indicate that the battery is charging using renewable power, a red LED may indicate that battery is charging using grid power, and a blue LED may indicate that the battery is either idling or discharging. Other light combinations may also be used.

The system may also include a Wi-Fi status indicator [124] to show if the system is connected to a network. The inclusion of Wi-Fi, or other communication medium or protocol, such as cellular telephone, Bluetooth, Zigbee, other RF circuitry, non-RF (AM, FM, or amateur radio for example) etc., may allow the system to be configured by the consumer and so that the system is able to receive demand response signals from the grid or otherwise controlled by the user. Such protocols may be effected using an off-the-shelf circuit and/or componentry, or may be custom designed for the particular use. The indicator [124] may be illuminated as green if the network connection is on and red otherwise. If the system is servicing a demand response signal it goes into demand response mode which is explained later and a yellow LED status [126] indicator may be illuminated to indicate this. Such communications circuitry for use in demand response modes (as well as modes that adapt usage to pricing, and modes which rely on predicting future (near term) capacity of a renewable source) may be part of a removable CPU or may be part of the standard hardware.

Since the system will be quite heavy mainly due to the weight of the batteries, a retractable handle [128] and built in wheels [130] are provided for easy portability. In some examples a modular approach may be adopted wherein the batteries or other components are removable to allow easier transport and/or replacement, as needed. In other examples, wheels or the like may be provided to make the system portable, while in still other examples, it may be useful to make the system difficult to transport to prevent or discourage theft.

Figure 2:
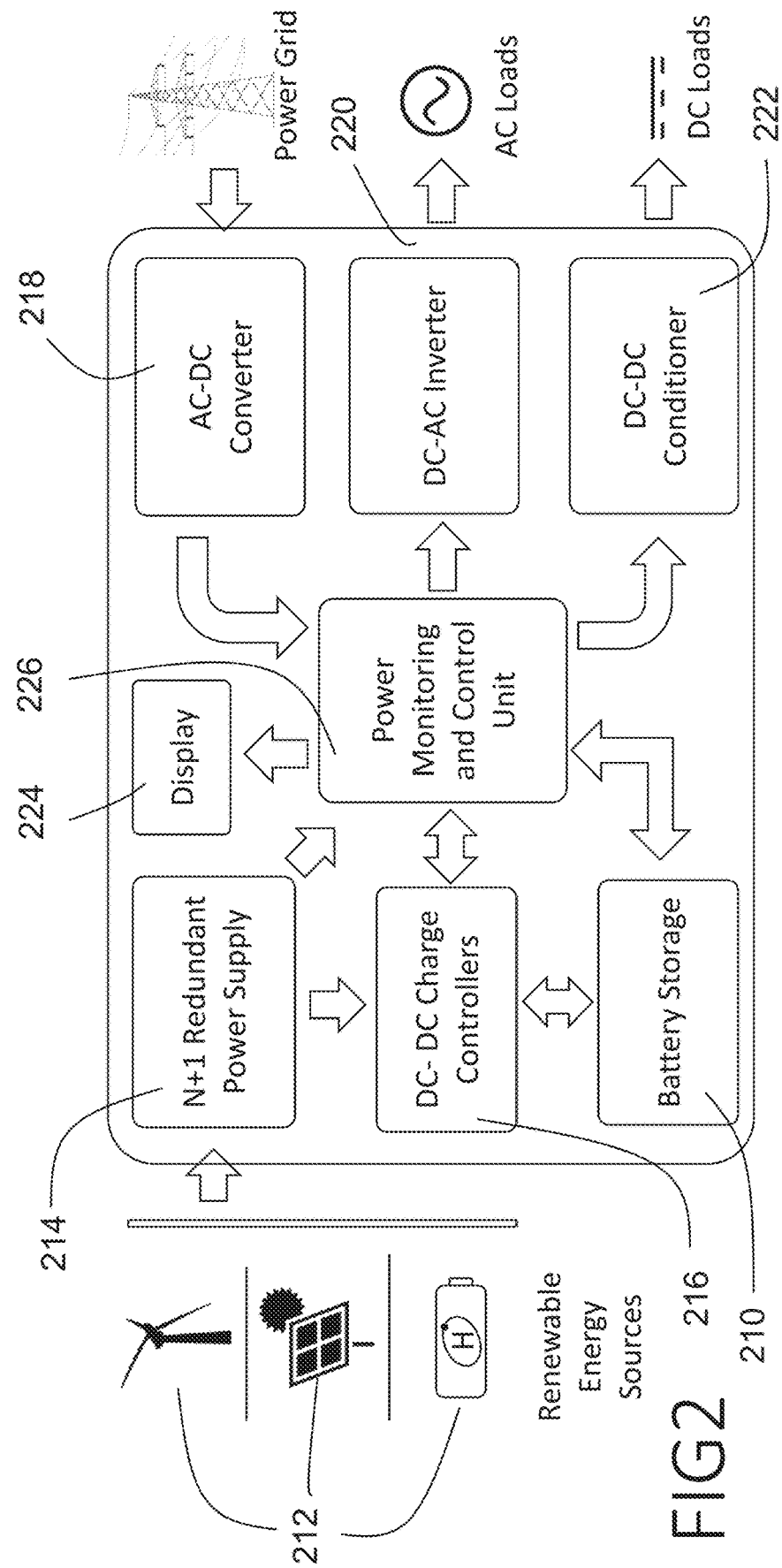
FIG. 2 illustrates the various modular components that can be part of the system.

FIG. 2 shows an internal block diagram of an illustrative system. This example shows 8 major components. The battery [210] stores electrical energy provided by renewable sources like solar, wind or Hydrogen Fuel cells [212], or electrical energy obtained from the grid. A electrical combiner circuit such as an N+1 redundant power supply system [214] can be used to take inputs from multiple renewable energy sources at the same time. A DC-DC charge controller [216] is responsible for charging the battery with intermittent renewable energy and preventing the battery from being damaged from over current/voltage or under current/voltage or overheating. It also prevents back feed of current to the renewable generator when the battery is providing power. In some examples, the battery storage [210] may be integrated into the system; in other examples, one or more terminals may be provided to couple to a removeable or replaceable modular batteries, allowing replacement of a damaged or out of service battery and/or allowing for larger or smaller batteries to be used, or different chemistries, with a single system.

A first converter in the form of an AC to DC converter [218] is used to convert grid AC high voltage to DC low voltage suitable for charging the battery from the grid. A second converter in the form of a DC to AC inverter [220] is used convert the DC battery voltage to grid-level AC voltage and/or household AC voltage so that the consumer is able to use it run household electrical appliances. A DC-DC conditioner [222] may also be used to supply power to DC loads at desired voltage/current levels. The system may be connected to a hardwired or a wireless display unit with or without a touchscreen [224] to communicate the measurement data to the users and receive inputs from the users. Alternatively, a wireless or wired connection interface operable with a smartphone or other external computing device may be provided to obviate the need for a touchscreen [224], with the user interface of the external computing device used instead.

The Power Monitoring and Control Unit [226] facilitates switching between the different power inputs and outputs based on battery state of charge, grid power characteristics, renewable power generation status/capability, and the other functionality of the system. The Power Monitoring and Control Unit may include a programmable microcontrollers and semiconductor comparators. It may be networked using a networking protocol such as a Wi-Fi connection, cellular data connection, Bluetooth, or even custom RF or other communications. The Power Monitoring and Control Unit can be programmed through a software application running on a computer or mobile system communicatively linked, whether directly or through a network, to the system.

Figure 5:
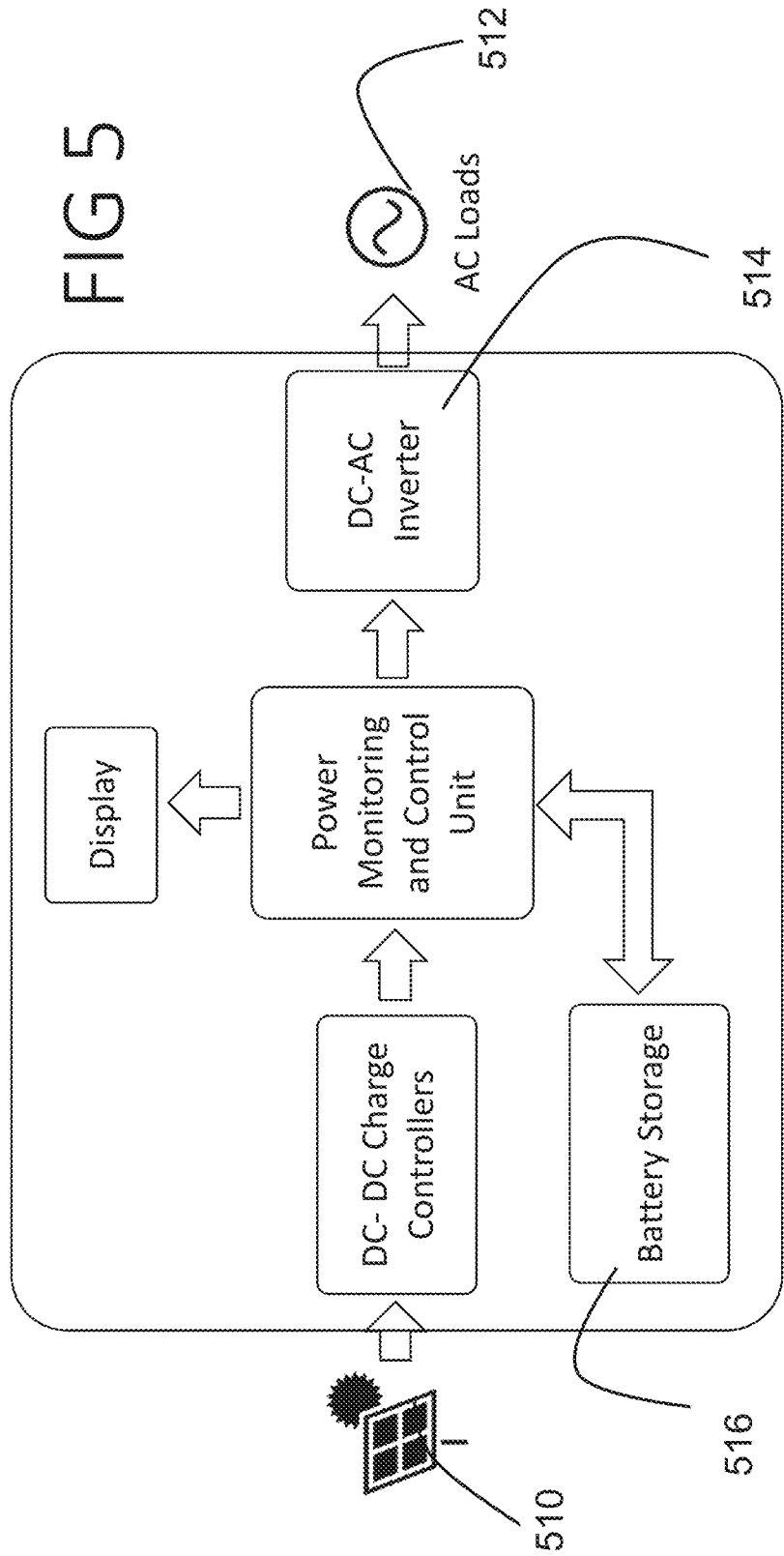
FIG. 5 shows the details of the power monitoring and control unit with a field swappable main controller hardware.
Figure 6:
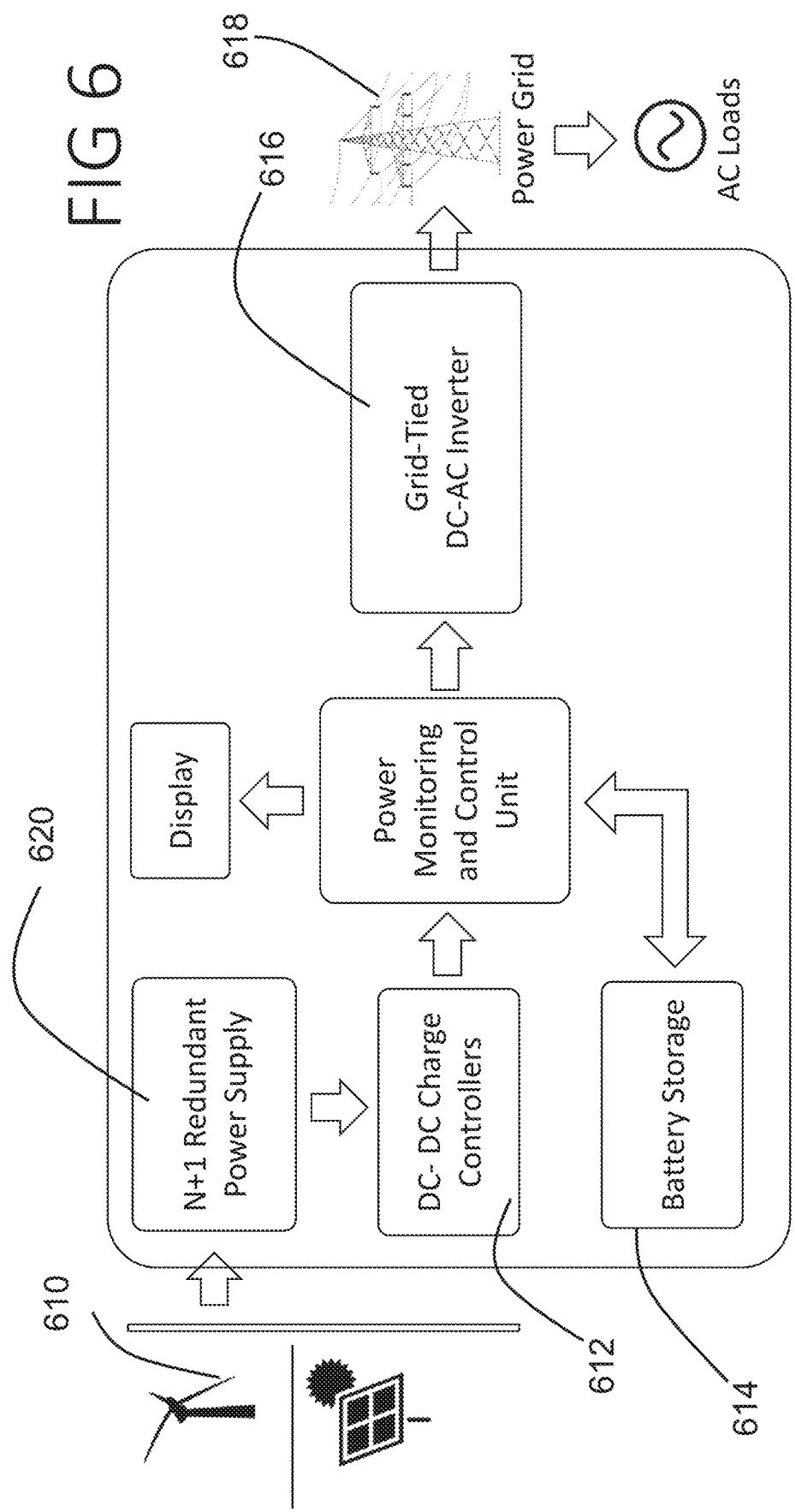
FIG. 6 shows some of the types of main controller hardware that can be used to control the energy system.

The various energy conditioning modules can be included or excluded from the complete system based on energy availability and needs. FIG. 5 and FIG. 6, further described below, show a few embodiments where the configurations include a smaller subset of the elements described here. The Power Monitoring and Control Unit has terminal connectors for various input energy sources and loads which can be utilized as needed.

Figure 3:
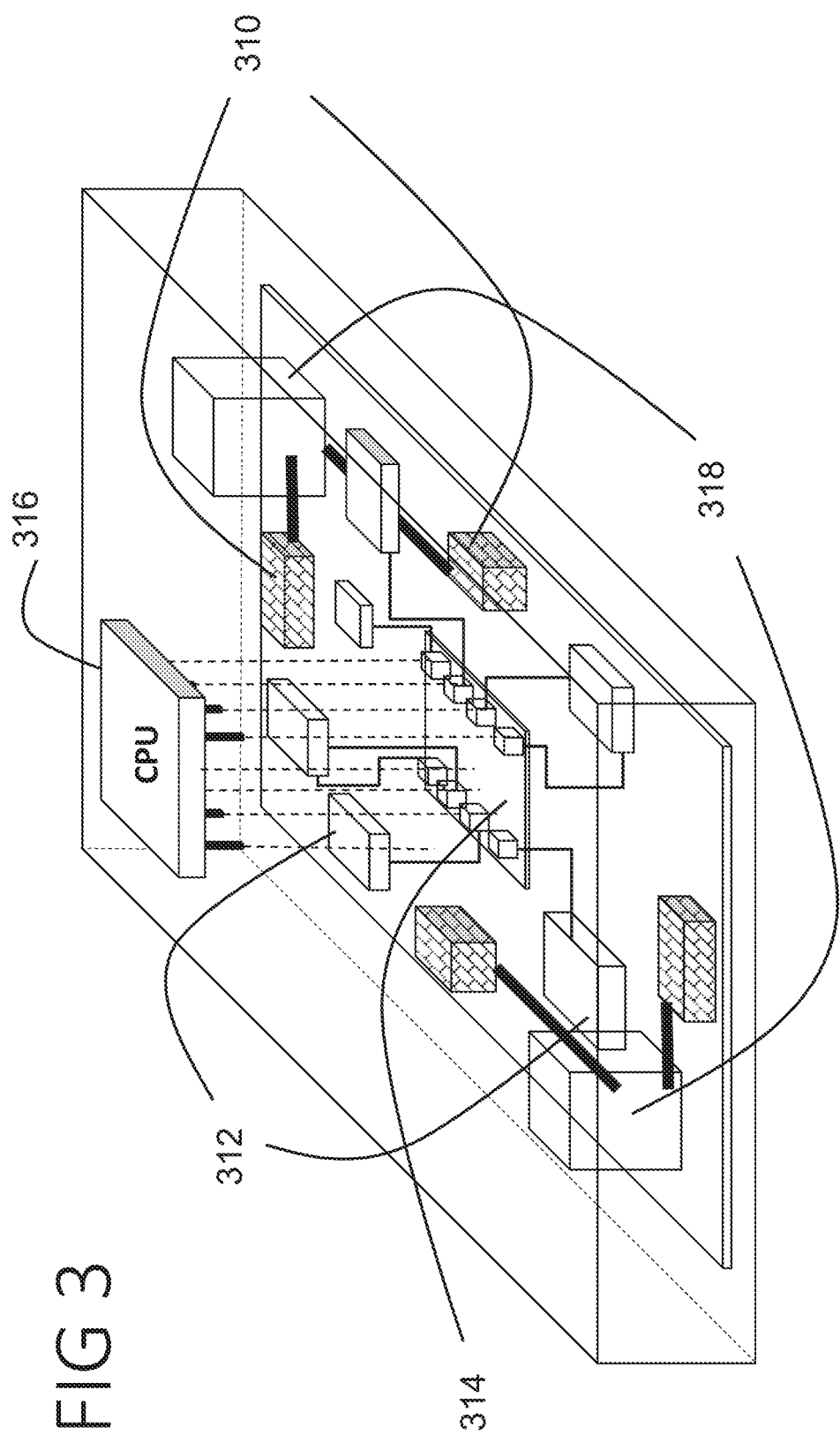
FIG. 3 shows one example of the system in an off-grid configuration with renewable energy.

FIG. 3 shows some details of the Power Monitoring and Control Unit where one can see the various terminals [310] that can transmit electrical energy from various sources to the loads mentioned in the previous section based on specific criteria. The Power Monitoring and Control Unit also has sensors [312] that measure electrical parameters like voltage and current that are connected to a Central Processing Unit (CPU) receptacle [314].

This receptacle can house different kinds of Central Processing Units (CPU) [316] based on consumer needs. For example, a consumer may choose from a variety of different CPU architectures and capabilities to match the need for optimizing system costs and system configurability. A predefined input and output board to board connector system can help the same CPU receptacle receive different kinds of CPUs that consume measurement data, run analytics and generate signals for relays and switches [318] on the Power Monitoring and Control Unit to operate and direct energy flow accordingly. This modular approach makes it possible to swap different CPUs at customer sites and in the field based on the needs of the customer.

Figure 4:
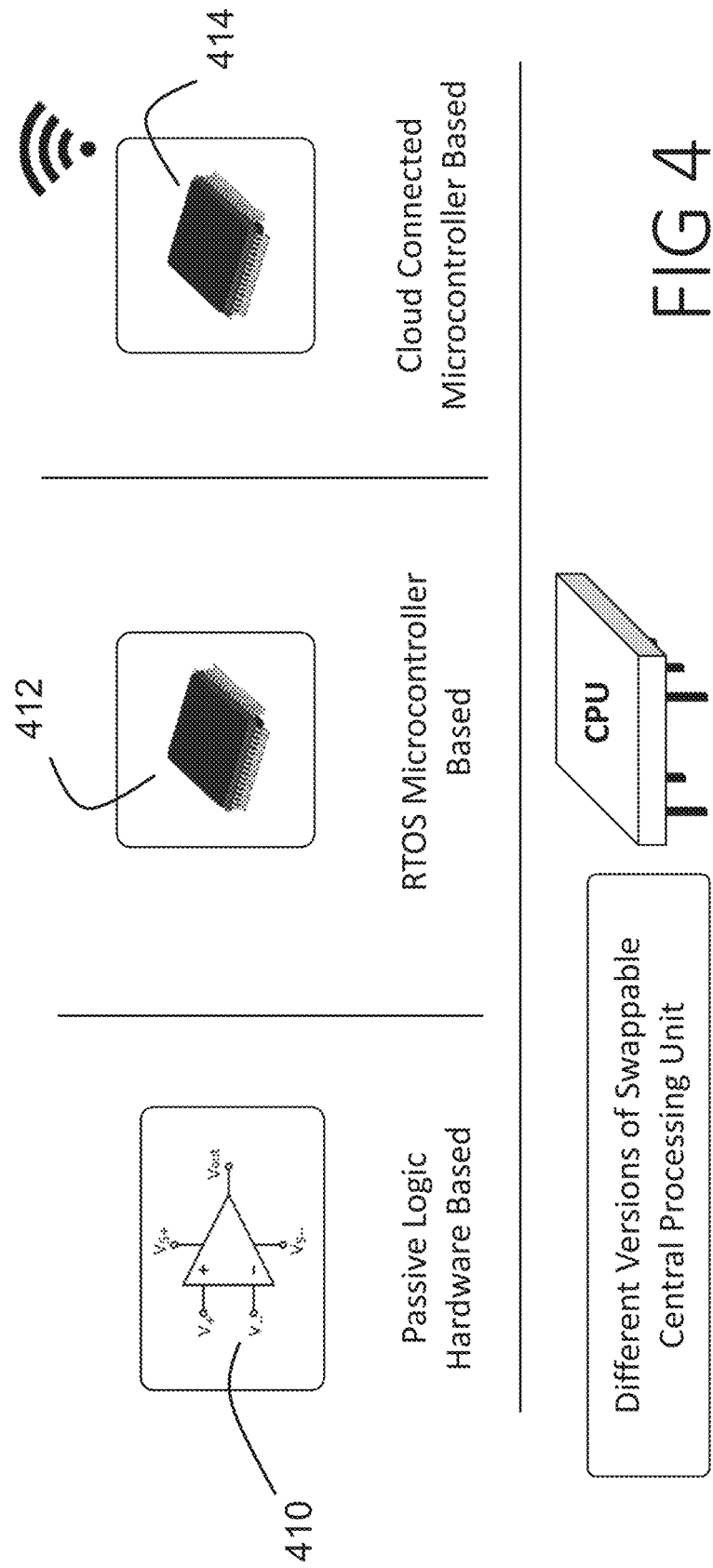
FIG. 4 shows one example of the system in a grid-tied configuration with renewable energy.

FIG. 4 describes a few embodiments of the Central Processing Units (CPU) that can control the Power Monitoring and Control Unit, by connecting to the CPU receptacle on board. The first embodiment is a very simple and cheap configuration based on passive logic semiconductor devices [410] like operational amplifiers and diode logics. The CPU may, for example, compare the battery State of Charge (SOC) to a prefixed reference value and control the relays to transfer or stop the flow of renewable and battery power to the loads. For example, in a renewable-preferred design, the CPU may direct charging of the battery whenever available renewable sources are operating at sufficient output to support both battery charging and service of the system load; otherwise the CPU may direct supply of the system load from the renewable sources alone (if sufficient to service the load), or with the aid of battery power; if the renewable source is unable to service the load or has no output, the battery may be used alone until discharged, and, only once other sources are unavailable, the load may be serviced using grid power. An alternative simple CPU may work as an uninterruptible power supply, keeping the battery fully charged whenever possible (whether by grid or renewable source), and only tapping battery power if the grid power fails and the renewable source(s) cannot service the load adequately. Simple passive elements can make the board inexpensive but can compromise on functionality.

For better functionality the CPU boards in another embodiment can include advanced microcontrollers with Real Time Operating Systems (RTOS) [412]. This more sophisticated CPU can perform more sophisticated data analysis on board as described below. In yet another embodiment of the CPU [414] the RTOS microcontrollers can be connected to a cloud based data analysis engine through a wireless network. This can help in performing further more complex analysis based on historical energy data, weather data and GPS based location data using Artificial Intelligence (AI).

Since these CPUs [410, 412, 414] have a common connection mechanism with the Power Monitoring and Control Unit they are easily interchangeable and can be swapped either before reaching the end customer or at the customer site. This can help in making the systems range from an extremely cheap system to an extremely sophisticated one by merely swapping the CPU boards on the Power Monitoring and Control Unit.

In an example, a less expensive/sophisticated first CPU may be adapted to monitor status of the rechargeable battery, power supply at the at least first and second inputs, and demand at the at least one output, and manage power using only the battery, power supply and demand statuses. In another example, a second CPU may be adapted to monitor status of the rechargeable battery, power supply at the at least first and second inputs, and demand at the at least one output, as well as at least one of historical use patterns, and time of day, and to manage power using the battery, power supply and demand statuses in addition to at least one of historical use patterns and time of day. In another example, a third CPU may be adapted to monitor status of the rechargeable battery, power supply at the at least first and second inputs, and demand at the at least one output, as well as to obtain data from at least one remote source related to at least one of grid power pricing and/or weather, and to manage power using the battery, power supply and demand statuses in addition to data from the at least one remote source.

Some embodiments take the form of a CPU only, in the further form of any one of the first, second and third architectures just noted.

Some embodiments of the present invention take the form of a "base station", which is the device in FIG. 3 minus the CPU. For example, an embodiment may take the form of a device as shown in FIG. 3, excluding element [316], comprising a plurality of terminals [310] that can transmit electrical energy from various sources including, for example, grid power and one or more renewable power sources, to one or more loads such as an AC load, a DC load, a rechargeable battery, interconnecting lines to selectively couple the terminals [310] electrically, sensors [312] that measure electrical parameters like voltage and current, relays and switches [318] in line with the interconnecting lines. The sensors [312] and relays and switches [318] are connected to a Central Processing Unit (CPU) receptacle [314]. The receptacle [314] can house different kinds of Central Processing Units (CPU) [316] based on consumer needs.

For example, referring now to FIG. 2, renewable energy sources [212] may couple to a modular (or integrated) N+1 Redundant Power supply [214]. Sensors are coupled to the power supply [214] to inform the power monitoring and control unit [226], which includes a receptacle [314] for a CPU, of the status, capability, and/or load on any of the renewable sources [212]. Relays controlled by unit [226] selectively couple the power supply [214] to DC-DC charge controller [216] which is used to monitor and manage battery storage [210] to, for example, prevent an overcharge condition. The battery storage is coupled to a sensor, such as a voltage sensor, that is usable by each of blocks and [226]. The device has a power grid terminal that links to an AC-DC converter 218; sensors are provided to allow the unit 226 to determine grid status, and one or more relays may be provided to decouple the AC-DC converter [218] from the grid if desired, or to isolate an output of the AC-DC converter [218], or both. A DC-AC inverter [220] is provided and linked, via an electrical line which preferably has one or more relays or switches therein to one or more a system DC sources such as the battery storage [212], the AC-DC Converter [218], or the N+1 Redundant power supply [212], where the unit [226] may control such switches relative to the DC-AC inverter [220] in response to sensed conditions using methods as illustrated below and in accordance with the capability and programming of the CPU. The DC-DC conditioner [222] is likewise coupled to one or more system DC sources such as the battery storage [212], the AC-DC Converter [218], or the N+1 Redundant power supply [212], where the unit [226] may control such switches relative to the DC-DC conditioner [222] in response to sensed conditions using methods as illustrated below and in accordance with the capability and programming of the CPU.

Various system embodiments take the form of a base station along with any one of the first, second and third CPUs, or with any two of the three CPUs, or with each of the first, second and third CPUs.

A plug-in CPU may be as shown in FIG. 4, with a number of pins or contacts (such as 8, 16 or 32 pins or other quantity), or that are electrically coupled by the base unit to relays, gates, etc. in the base unit. The CPU may itself have Wi-Fi, Bluetooth or other communication circuitry.

FIG. 5 shows an embodiment of the complete system configured to run in an off-grid situation, where the renewable energy from solar panels [510] can be channeled to the AC loads [512] through a DC-AC inverter [514]. The battery [516] stores excess electrical energy not consumed by the load and buffers out the variability of intermittent power generation inherent to solar. In such an embodiment, a relatively simpler CPU may be used, if desired, simply controlling the charging of the battery [516] when excess power over the demand/load is available. A more sophisticated approach may titrate usage of stored power during a time period (such as night time) when the renewable source is understood to be less available, to prevent the battery [516] reaching a state of deep discharge or running out, particularly if grid power is unstable or unavailable. In some systems, the DC-AC converter [514] may include first and second load outputs, to allow separation of "critical" and "non-critical" loads as, for example, may be the case for an off-grid user having emergency lighting and a refrigerator, for example, as "critical" uses, and air conditioning as a "non-critical" use.

FIG. 6 shows yet another embodiment of the complete system configured to run in a grid-tied mode where renewable energy from multiple sources like wind and solar [610] are channeled to the utility grid [618] through a DC-DC charge controller [612] that also charges a battery [614] and subsequently through a DC-AC grid-tied inverter [616]. Here, a more sophisticated CPU may be used to integrate real time pricing information for the power grid, to allow power to be stored for later sale onto the grid if prices are low at a given time, or to manage battery storage in accordance with some of the methods shown below in FIGS. 7-13. In some examples, the renewable sources [610] may not be connected at all, allowing the system to readily convert to a time-shifting power supply that stores energy when grid power [618] is cheap, and uses stored energy when grid power [618] is expensive.

FIG. 5 and FIG. 6 show how easy it is to reconfigure an off-grid system to a grid-tied system just by swapping an off-grid DC-AC inverter [514] with a Grid-Tied inverter [616] and how easy it is to include multiple renewable sources into the energy mix with the help of a redundant power supply [620].

Referring back to FIG. 2 now, the system modular elements that may be provided as separate modules to add or remove at the customer's preference may be, in some examples:
- modular battery storage 210 to allow the user to configure the total battery capacity;
- modular AC-DC converter 218, to allow the user to omit this block for total-off grid use such as when camping;
- modular DC-DC conditioner 222, which a user may omit or include as needed;
- display 224;
- elements of the power monitoring and control unit 226, including the CPU as illustrated above;
- the N+1 redundant power supply 214, which may be omitted for a user having only one renewable energy source;
- modular DC-AC inverter, as for example if a consumer is going to use the system in a location where output AC is not needed, such as if only DC loads are needed By making more of the elements of the system modular, it becomes possible to make a very cheap and lightweight system that is adaptable to more expensive and bulkier applications.

FIG. 7 through FIG. 13 show a collection of flow diagrams that describe the different algorithms that a sophisticated CPU can be programmed for in order for the complete system to function under various operating conditions and user requests. These flow diagrams may be implemented through software instructions stored in a memory, such as flash memory, coupled to and operable by the microcontroller that resides in the Central Processing Unit.

Figure 7:
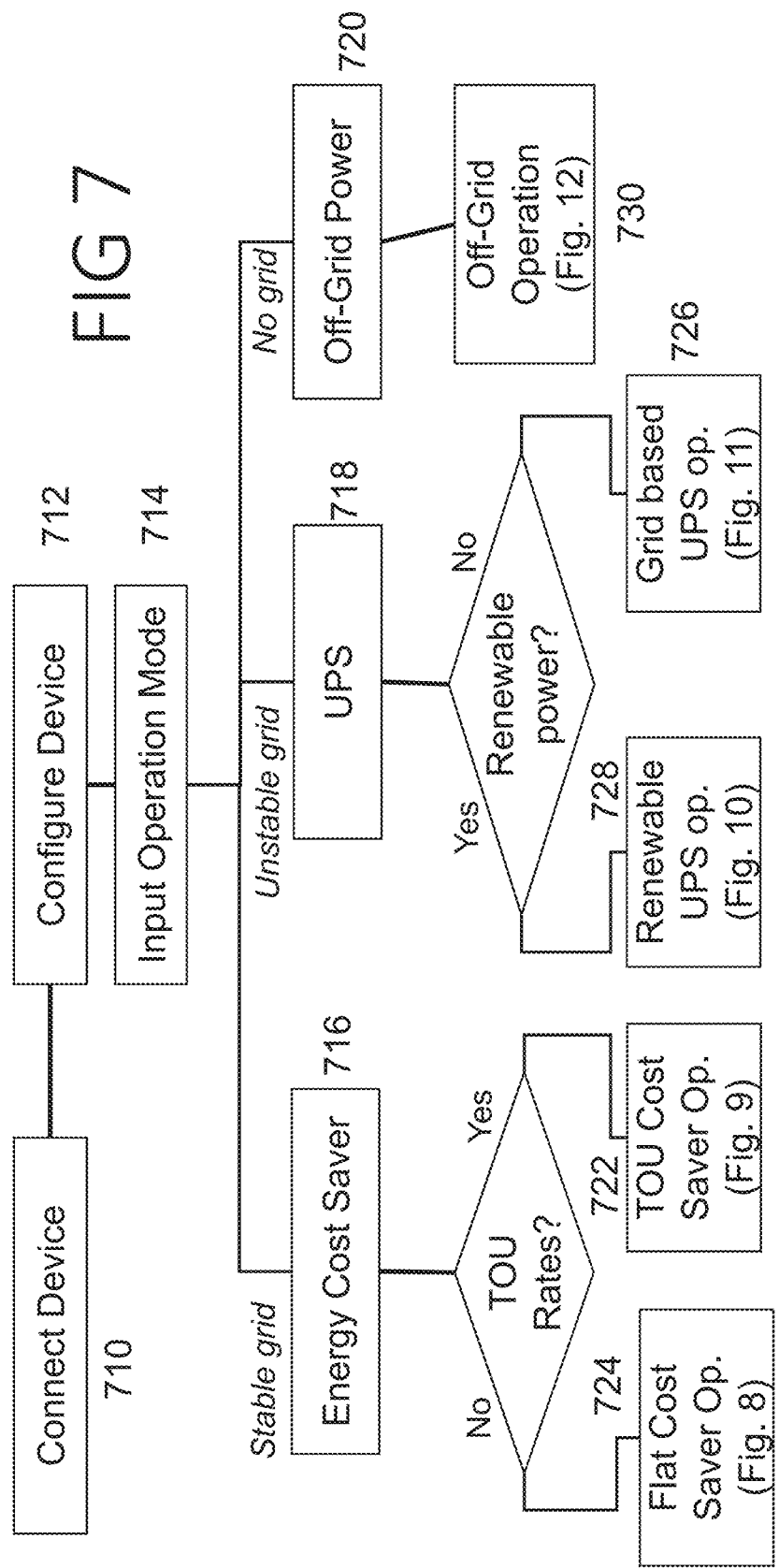
FIG. 7 illustrates a flow diagram of one embodiment of the main system configuration software.

FIG. 7 is an embodiment of the basic operation procedure of a microcontroller based CPU. In block [710] the process starts by connecting the system to a Touchscreen display, a Local Area Network (LAN) or to a point-to-point network that is established with another computer and/or cloud based server with a mobile system like a smartphone or tablet. Certain standard networking protocols like Bluetooth or Wi-Fi may be used in block [710].

In block [712], a Graphical User Interface (GUI) software application running on the onboard microcontroller itself, on a remote computer or mobile system utilizing the network, configures the microcontroller in the Central Processing Unit. Alternatively, a local computer or mobile system may be used to provide control, such as by connection using a USB cable or other wired connector such as an Ethernet cable or by access via a wireless connection such as Bluetooth or WiFi.

In block [714] the system gets initialized and boots into a default selection mode. The user can then select the use case of the system. The illustrative system has 3 different major use cases. (1) Energy cost saver [716] which may be deployed when the system is connected to a stable electrical grid, (2) Uninterruptable power supply (UPS) [718] which may be deployed when the system is connected to an electrical grid that is unstable and prone to brown outs (3) Off-grid where no electrical grid is present and the system is used for managing utilization of on-site generated renewable electricity only [720].

For use case (1), having a stable electrical grid available, the system may facilitate sub-cases for use depending on whether the utility that operates the electrical grid provides time-of-use (TOU) rates or not. If TOU rates are available then the system enters the TOU energy cost saver mode [722] illustrated in FIG. 9. If TOU rates are not available and the utility just provides flat electrical rates then the system enters the flat utility rate cost saver mode which is illustrated in FIG. 8.

Figure 10A:
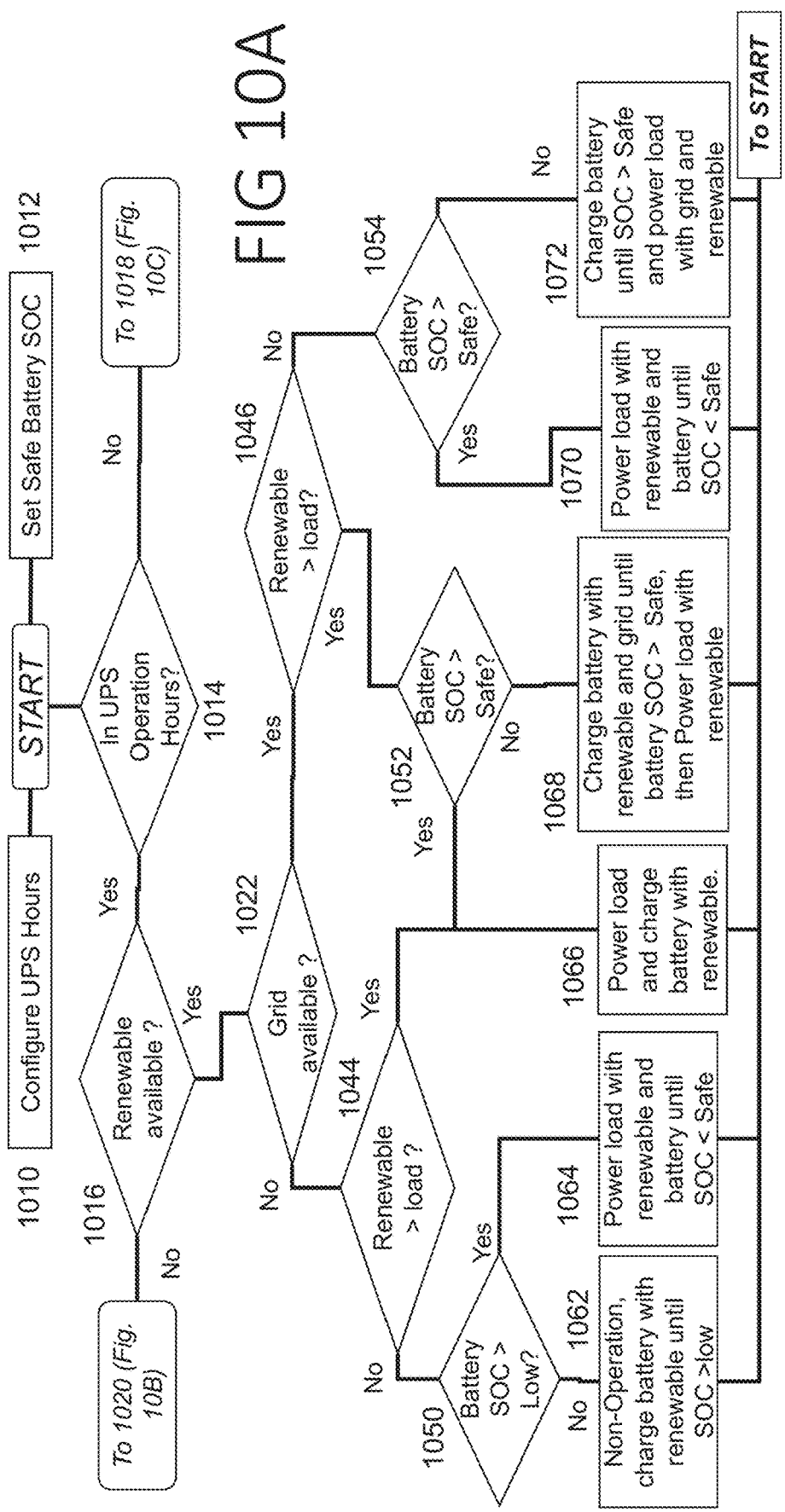
Figure 10B:
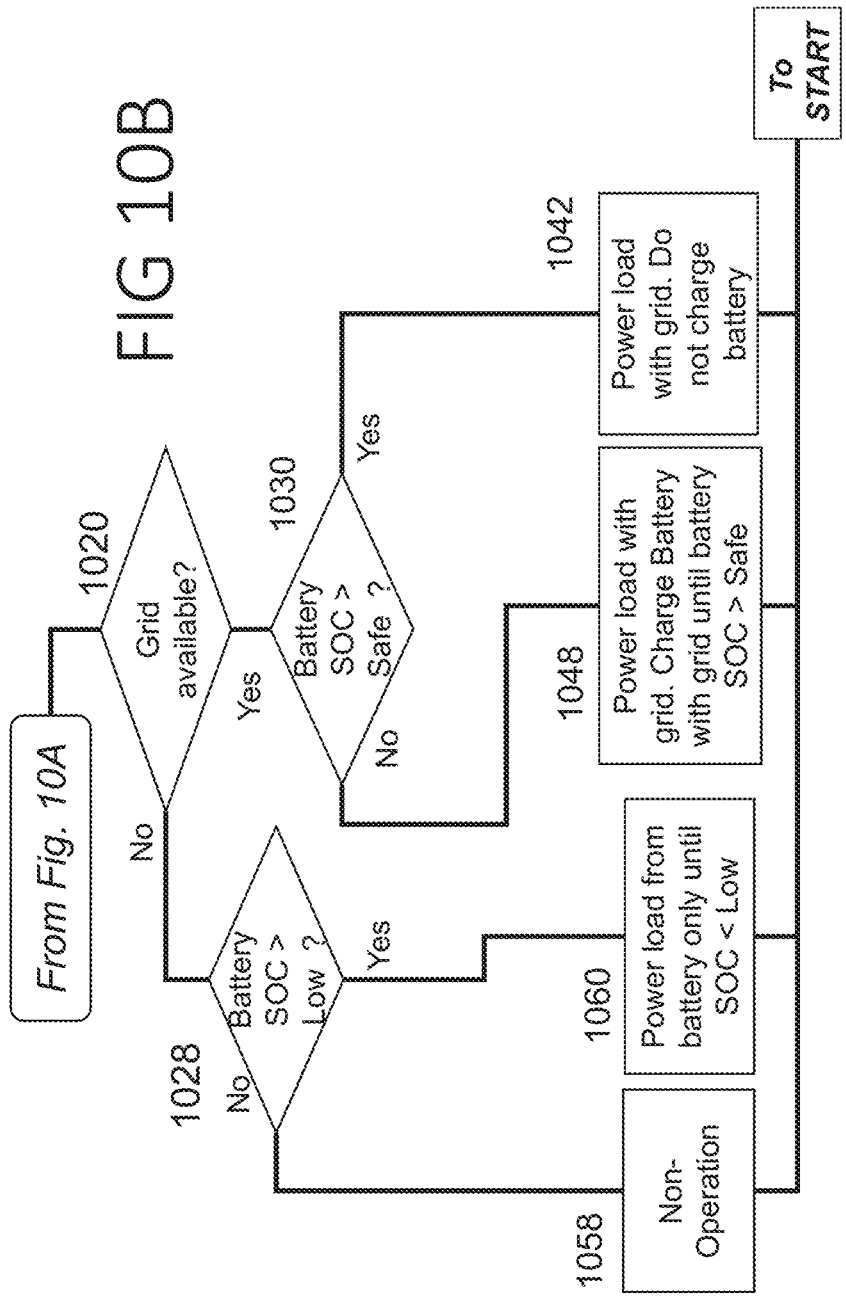

For use case (2), a UPS mode, 2 different further use cases can arise. If there is no on-site renewable energy generation then the system behaves as a traditional UPS storing electrical energy from the grid when it is available and using stored electrical power if/when grid electricity is unavailable [726]. However, if renewable electricity is available then that may be used to supplement the grid electricity and reduce costs. In addition, with renewable electricity available, the system can provide power over longer stretches of grid unavailability than would be possible if relying solely on the renewable energy sources [728]. The operation details in this mode are illustrated in FIGS. 10A-10C. Finally, if there is no electrical grid then the system enters Off-grid operation mode illustrated in FIG. 12.

Once the user selects a particular mode, or a particular CPU, the CPU algorithm performs specific checks and tasks listed as various embodiments of the CPU algorithms described in FIG. 8 through FIG. 13. It should be understood that the methods shown in FIG. 8 to FIG. 13 may be implemented in a microcontroller or microprocessor, as desired, or may alternatively be performed using, for example, a field programmable gate array or other logic structure applying a series of logical tests to a set of inputs captured from the user and associated sensors in the device.

Figure 8:
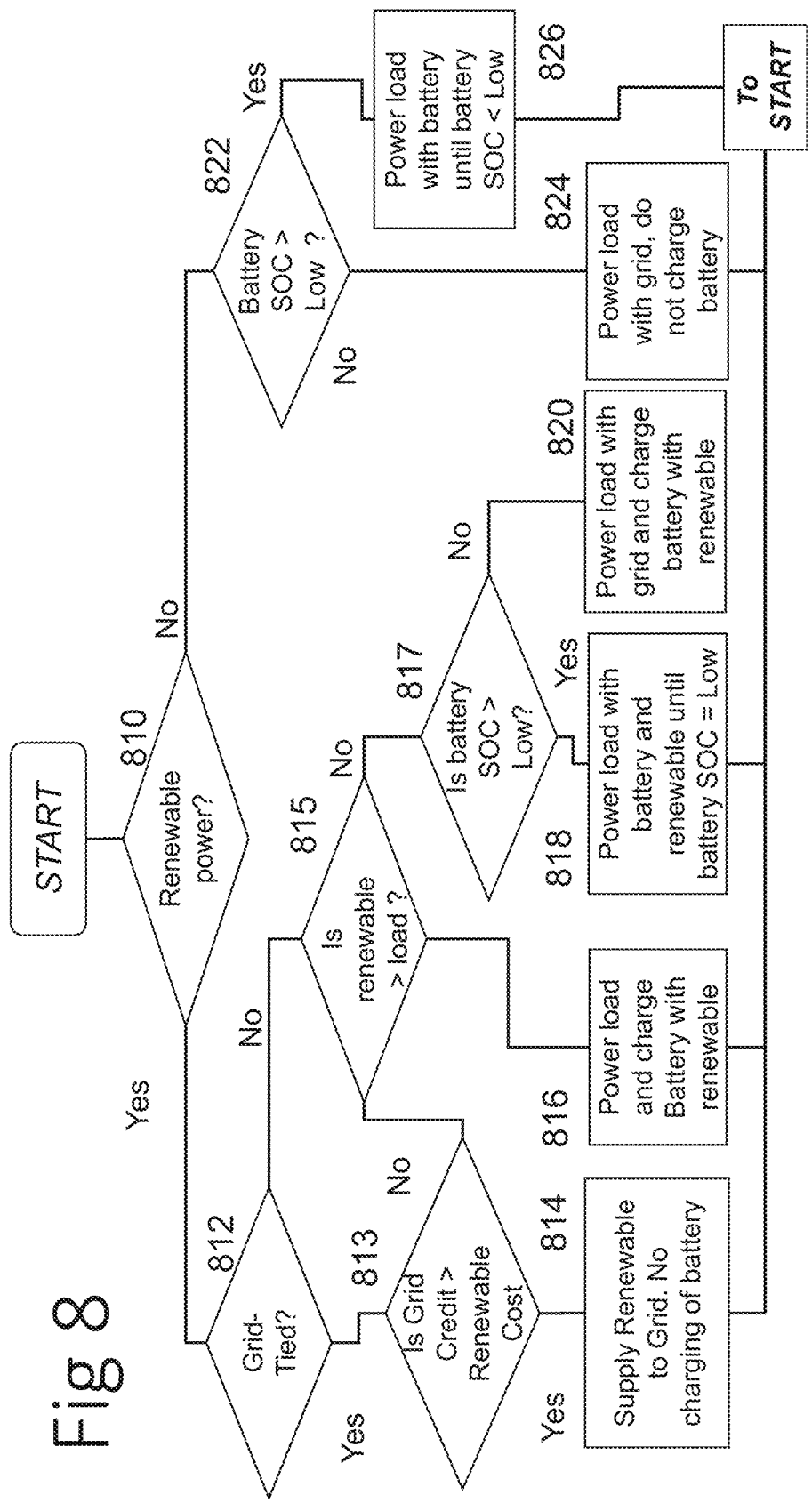
FIG. 8 illustrates one embodiment of system operation used when operating as an electrical energy cost saver under flat electrical energy rates supplied by the grid.

FIG. 8 illustrates one embodiment of the CPU algorithm in which the system is operating as an electricity cost saver under flat electricity rates from the grid. In [810] the algorithm checks whether on-site renewable generation is available. If so, the system determines whether it is a grid-tied system at [812].

If the system is a grid-tied system and the monetary credits users receive for renewable energy pumped into the grid is more than the cost of renewable power generated [813] then the renewable energy is pumped back into the grid as indicated at [814]. If this is not the case or if the system is not grid tied, the algorithm checks if the renewable power input is higher than the load power requirement, as indicated at [815]. The input power availability may be determined, for example, by applying a load and determining the quantity of load that can be sustained by the input without dropping voltage. The load power requirement can be determined by, for example, monitoring current throughput of the output, given known parameters for the output itself (i.e. the output may be generating 120 or 220 volt AC signal).

If the renewable power input is higher than the load power requirement, then the system powers the output with renewable power only and uses the excess renewable power to charge the battery [816]. This procedure may be performed by monitoring the output to ensure continued output supply at rated levels as the battery charger circuit receives power. If the output supply begins to stray from its rated level, the battery charger receives less supply by, for example, reducing duty cycle to the battery charger or controlling a quantity of current distributed to the battery.

The algorithm then determines whether there is adequate charge in the battery in [817] to decide, given that the renewable power capacity is less than the load demand, whether to use the battery in combination with the renewable source power to supply the load [818], or to instead power the load with grid power and charge the battery with renewable power source [820]. Whether the battery may be used is determined at [817] using reference to a variable "Low", the low battery state-of-charge (SOC), which is an input, typically in percentage terms, that a user may provide during the configuration process.

The low SOC threshold is provided for safety purposes to ensure that the battery does not become over-discharged, which can present difficulties for some rechargeable battery chemistries. For example, some chemistries do not facilitate a zero volt recharge of the battery, which may lose capacity or become non-functional if discharged too fully; in other chemistries a trickle-charging process is required to bring back a battery from full discharge, slowing and complicating recharge. The base station may manage slow recharge/trickle recharge if desired, or the batteries may be supplied in a module that includes circuitry for trickle recharge management until a battery voltage threshold allowing safe full power recharging is passed. For example, modular or integrated batteries may comprise circuitry to manage one or more of overcharge (such as a basic voltage measuring circuit and a relay or switch to isolate the battery once fully charged), temperature (such as a thermistor to shut down or throttle battery charging or discharging in response to high temperature conditions), short (such as a current monitor to isolate or throttle battery output if high current/shorting is detected), and low charge conditions (such as a shut-down switch to prevent current draw below a predetermined voltage). Alternatively, these functions may be provided in the base unit such as by providing current and voltage management via a DC-DC charge controller block [216] as shown in FIG. 2.

If no renewable power is available in block [810] then again the battery SOC is checked in [822]. If adequate charge is available in the battery then the output is powered by the battery alone in [826], and if not, then by the grid only as in [824]. The operation situation of the system is reevaluated on a continuous basis to determine the most suitable course of action at any point of time. Thus, all action boxes loop back to the start node in to [810] and the above process is repeated on a continuous basis, at fixed intervals in time. In the example shown, the battery is only charged from excess renewable power. However, when renewable power is not adequate for recharging the battery, the battery may instead be charged from grid power. A further example is shown below in FIG. 9 where the battery is charged from the grid when grid power is cheap, for example.

Figure 9:
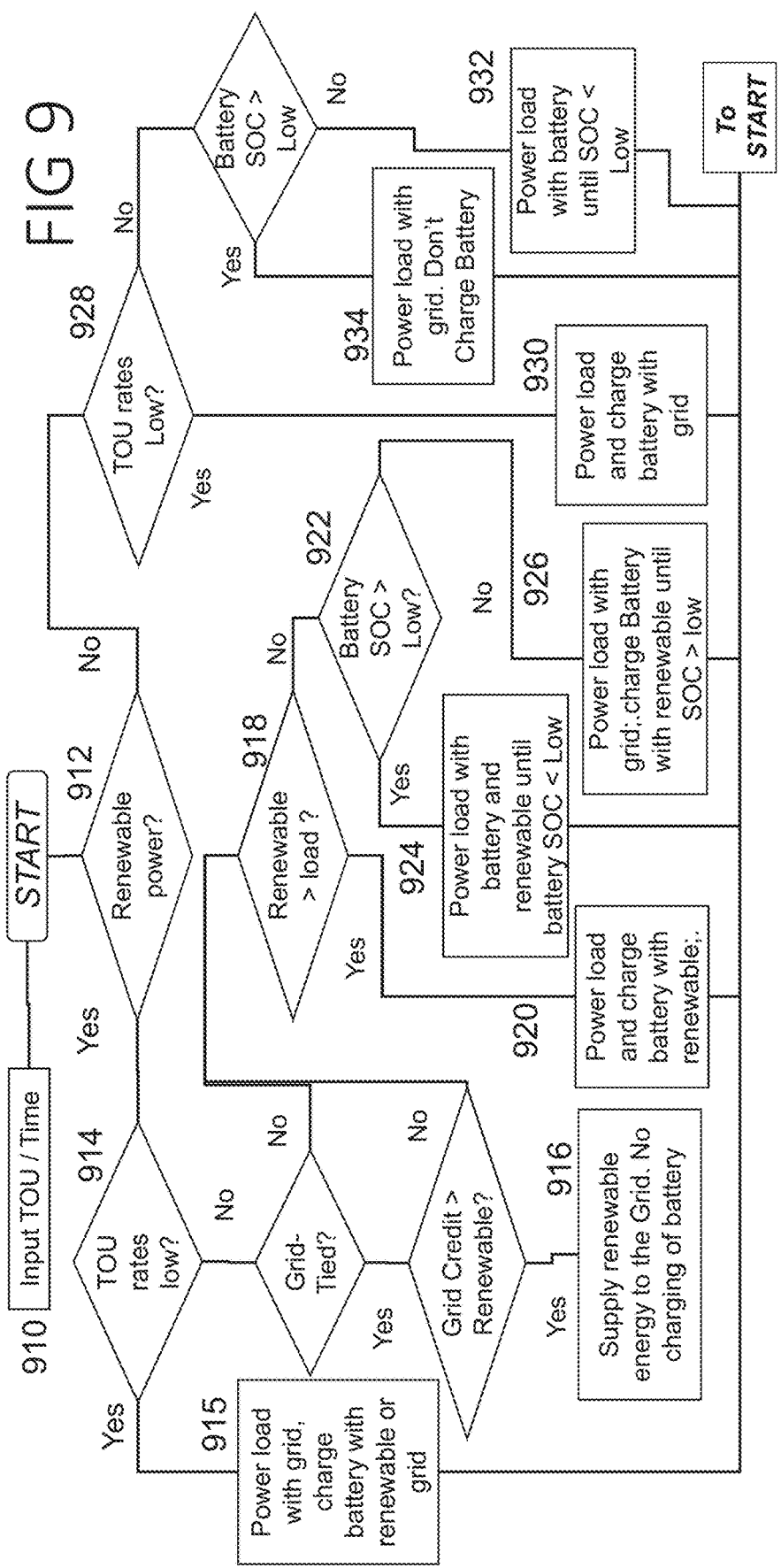
FIG. 9 illustrates one embodiment of the flow diagram of the system operation when operating as an electrical energy cost saver under time-of-use electrical energy rates supplied by the grid.

FIG. 9 illustrates yet another embodiment of CPU algorithm where the system operates as an energy cost saver under a grid operated by a utility that provides Time-of-use (TOU) rates of electricity. Here, the operation of the system is slightly more complicated than the scenario in FIG. 8 above as under certain scenarios it may be better to conserve battery power and use grid power as it is cheap during certain times of the day. Further, it may be viable to store cheap grid electricity during low rate times in the battery for use during the high rate times of the day. Thus here, not only is the battery available to time-shift excess renewable source capacity, but it can be used to time shift cheap grid power for use when the TOU rates are high.

In block [910] the user of the system inputs the time of use rates in the system. These rates may be different for weeks and weekends and may vary between summer and winter. It is important to set the time and date of the system correctly as the decisions taken by the system will otherwise be inaccurate. If TOU is provided by the utility on an ongoing basis—for example, throughout the day TOU may change—the rates may be automatically downloaded from the utility. In networked examples, the date and time information may be uploaded to ensure accuracy.

In block [912] it is first checked to see if renewable power is available to the system. If so then it is checked if the TOU rates are low [914] using a look-up table or dynamic rate information obtained from the utility company. If yes, loads are supplied with grid power and the battery is charged with renewable or grid power or a combination of both [915]. If the TOU rates are not low and the system is a grid tied system where the utilities provide a reasonable monetary incentive to pump renewable energy into the grid, the CPU may allow pumping energy from renewable sources into the grid and without charging the battery [916].

If the monetary incentive from the utility companies is not good, or the system is not grid tied then the algorithm checks in block [918] if the renewable power is higher than the load. If this is true then the output load is powered by renewable power only and the extra renewable power (if any) is used to charge the battery until it is fully charged [920]. If there is not enough renewable power to supply the load then in block [922] it is checked if the battery capacity is above its low SOC threshold value "Low". If this is true then as in block [924] the load is powered by a combination of battery and renewable power until the battery is discharged [926]. However, if the battery does not have adequate charge then the loads are powered with grid power and battery is charged from renewable sources [926].

If the renewable power is not available, the system determines whether the TOU rates are low at that time [928] using a look-up table or dynamic rate information obtained from the utility. If the rates are low then the output is powered by grid power and the cheap grid power is also used to charge the battery until it is fully charged [930]. However, if the TOU rates are high and battery power is available then the output is just powered by the battery until the battery SOC runs low [932]. If the battery is sufficiently discharged then the loads are powered from the grid (at high TOU rates) as the last resort [934]. The battery is not charged from the expensive grid power in this example.

The definition of low or high TOU rates may be selected by the user, if desired. In some examples, a machine learning or Artificial Intelligence system can monitor usage and TOU rates to optimize usage and minimize costs.

In another example, there may be three tiers for TOU: low, during which the battery would be charged from the grid if needed; high, during which battery power is preferrred for use before grid power, and intermediate, during which battery capacity can be preserved for use if the TOU gets to a high level. In the intermediate range, grid power would be used to provide output power, either alone or in combination with renewable source(s) if available, but the battery would be neither charged nor discharged within reasonable limits. A machine learning system may come to predict ranges for low, intermediate and high on a given date and time given preceding days activities. In some examples, a machine learning system may consider as variables one or more of predicted temperature, wind, humidity and/or cloud cover, as well as known daylight time or other cyclic information, in estimating expected load, TOU rates, and renewable source capability.

In some further examples, a user may encounter tiered electricity billing rates. For example, excessive draw at a given time by individual users on a grid can lead to instability of the grid. A utility may determine to establish not only TOU pricing, but also pricing based on actual draw during certain time periods, with, for example, a base rate for a first draw of current (the first ampere costs X), and an escalated rate for higher draw (the second ampere costs 2×). In this example, the battery may be used to shave off peak load from the grid. Thus, if the output load increases (for example, an appliance or air conditioner turns on), the battery would be used while the load is increased; when the load returns to a lower level, only grid energy is used again. When the load is reduced, the battery may be charged from the grid until peak load again occurs. Thus the battery may be used to smooth out usage in an escalated rate situation.

FIGS. 10A-10C illustrate one embodiment of a method for operating an UPS with unstable grid power as well as on-site renewable power. In this type of situation the system can handle complicated control sequences as it acts as a hybrid between a cost savings system and electricity output stabilizing system and configures itself according to various internal and external parameters. In this example, the system works in an Uninterrupted Power Supply (UPS) mode. The CPU algorithm works as follows. Starting at FIG. 10A, in block [1010] the system is configured by the user for the hours in which the system is expected to work as a UPS, possibly anticipating a power failure, which defaults to 24 hours in UPS mode. The available reduced operation hours is provided to allow a user to conserve battery power in case of a highly unstable grid. In block [1012] the safe battery SOC limit is input by the user which may defaults, in an example, to 50%. This limit is used by the system to discharge the battery under certain conditions to save on electricity power costs using on-site renewable energy generation. After the safe SOC limit is reached the system behaves as a pure UPS. If this limit is set to 100% then the system behaves as an UPS only and the energy cost saving mode is not used at all. That is, the safe SOC limit is provided by the user to ensure that power is available between the safe SOC limit and the low SOC limit for use in UPS mode. A lower safe SOC allows greater usage of the battery to store cheap or no-cost electricity for use at later times.

First it is checked if the device is within its operation hours [1014]. If the answer is no at block [1014], the method jumps to block [1018] in FIG. 10C. If the outcome at [1014] is true it is further checked if renewable power is available [1016]. If renewable power is not available at block [1016], the method jumps to block [1020] in FIG. 10B.

Turning to FIG. 10B, block [1020] determines whether grid power is available. If grid power is unavailable then the system is operating in a UPS mode at this point. Next the system determines whether there is enough charge in the battery. That is, if the battery charge is above the low SOC level [1028]. If that answer is also false then there is no power available (Recall, block [1016] found no renewable power, and block [1020] found no grid power; with the battery low, the UPS cannot supply power). Thus the system remains idle in non-operation mode in block [1058]. If the battery SOC is above the low boundary at block [1028], then the battery is used to power the output load until it is discharged [1060].

In the event that both grid and renewable power sources are unavailable—that is on reaching [1028], the system may set an alarm to notify a user—locally or remotely using network resources—of the concomitant grid and renewable source outage. Indeed, any time a source is unexpectedly unavailable, the system may issue such a notification. For example, if it is daytime and a solar source is unavailable, that may be unexpected and so an alarm can be issued. Anytime the grid is unavailable this may be deemed unexpected, though the user may be allowed to select otherwise.

In [1020] if grid power is available it is checked if the battery SOC is greater than the safe battery limit [1030]. If the battery charge is below safe limits then the available grid power is used to power the output load and also to charge the battery until its SOC reaches the safe limit [1048]. Otherwise the grid power is used to only power the output [1042].

Returning to FIG. 10A, at [1016], if renewable power is available then it is first checked if grid power is also available [1022]. If grid power is unavailable then it is further checked if the available renewable power capacity exceeds the demands of the load [1044]. If so then only renewable power is used to power the output and the excess renewable power is used to power the battery until it is fully charged in block [1066]. However, if the renewable power is less than load in [1044], then a further check is made to see if the battery has enough charge [1050] to be used. If this is true then the output is powered by a combination of renewable power and battery power until battery is fully discharged [1064]. However, if the battery is already discharged then the system cannot power the load and enters non-operation mode while the inadequate renewable power is used to charge the battery until the charge recovers enough to resume system operation [1062]. Hysteresis may be built into block [1062] by having the non-operation remain in force until a battery SOC that has at least some margin above the low boundary is available, such as sufficient power to manage the load for at least a minimum period of time, or such as by holding block [1062] for a minimum duration, to avoid toggling power on and off which may be annoying to a user or even dangerous or damaging to powered devices.

In [1022] if grid power is available then it is checked if renewable power capacity exceeds the load [1046]. If this is true then it is further checked if battery SOC is higher than safe limits [1052]. If this is true then the load is powered with renewable energy only and the excess renewable energy is used to charge the battery until it is fully charged [1066]. However, if the battery has been discharged to below the safe SOC then the battery is first charged with a mixture of grid power and renewable power until its SOC reaches safe limits as indicated at [1068]; once the battery is above the Safe limit, the operation may revert to that of block [1066].

If renewable power capacity does not exceed the load in [1046] then it is again checked if battery SOC is higher than safe limits [1054]. If this is true then the load is powered with renewable power and battery power until the battery SOC reaches the Safe limit [1070]. If the battery SOC is already below the Safe threshold, then the output is powered by grid power and renewable power and grid power is used to charge the battery until the SOC reaches safe limits [1072].

In [1014] if the system is outside its operation hours the method turns to FIG. 10C. At [1018], the method determines whether renewable power is available [1018]. If this is true it is further checked if the grid power is available [1024]. If grid power is available then it is further checked if the battery SOC is exceeds the safe threshold at [1032]. If this is true then the battery is charged with only renewable power [1034]. If the battery SOC is unsafe then both the grid power and renewable power are used to charge the battery quickly [1040]. If grid power is unavailable in [1024] then the battery is only charged with renewable power until it is fully charged [1034]. If there is no renewable power available in [1018], it is again checked if grid power is available [1026]. If this is true then it is further checked if the battery SOC is over safe limits [1036]. If this is not true then the battery is charged with grid power until its SOC reaches safe limits [1056]. If the battery SOC is already safe or there is no power available from any source then the system enters a non-operation mode [1038].

At a high level, it can be seen that when the grid power is available, the battery will be charged at least to its safe SOC, regardless whether renewable power is available. The battery gets charged to its full power in only two cases—when the renewable power is of greater capacity than the load, and when renewable power is available outside of operation hours. One way of describing the use case is that the battery capacity is partitioned, with its capacity between full and the safe SOC useful for time shifting renewable power, and the capacity between safe SOC and low SOC useful to provide stable power when the grid is unavailable.

In the above cases when the system is not within operation hours, the output of the system remains deactivated. As before the operation situation of the system is reevaluated on a continuous basis to determine the most suitable course of action at any point of time. Thus all action boxes loop back to the start node and the above process is repeated on a continuous basis.

Relative to FIGS. 10A-10C, consider two examples:

A household having a prior art UPS with available solar and grid power, with peak electrical demand from 4 pm to 10 pm each day, having a renewable energy source with peak production from 8 am to 8 pm, where the renewable source production exceeds load from 8 am to 4 pm, and load exceeds renewable source capacity from 4 pm to 8 pm, with the renewable source unavailable after 8 pm. This is a simplified version of solar residential use. The renewable source can be used in this system to eliminate grid reliance between 8 am and 4 pm, and facilitates limited power availability in the event of grid interruption, but would attempt to sell the excess renewable source capacity to the grid between 8 am and 4 pm, when the grid does not need it and will offer reduced compensation. The entire time this all takes place, the UPS battery remains at its full capacity in the prior art.

A household with the present invention, faced with the same scenario. From 8 am until the battery is charged fully, the renewable source excess capacity is not shunted to the grid but is instead used to charge the battery. Starting at 4 pm, the battery is used to supplement the renewable source energy capacity until the battery reaches the safe SOC threshold, at which point the system begins using grid power to supplement the renewable source energy capacity. From 8 pm until 8 am, the battery remains at its safe SOC threshold, but is again recharged the next day once the renewable source capacity exceeds load again. In this manner the battery allows time shifting on a daily basis to reduce grid reliance.

In this example, the safe SOC variable is provided to allow the system to offer a battery backup or UPS while the system offers functionality to let the battery be used to time shift grid power usage or even renewable source usage. Typically the prior art would maintain the battery at a full or nominal charge level all the time, in order to facilitate use as a UPS. Here, however, the UPS function remains available by setting a safe SOC threshold, with the rest of the battery capacity available to store and release electricity as needed by economical or other factors. The safe SOC threshold may be selected by a user to allow operation of basic needs as for example, in a household usage, the safe SOC may be adequate to keep some lighting available and one or more necessary appliances operating for a selected time period (a day or a week, for example). Safe SOC may instead be selected to ensure that the system itself can maintain internal operations (computing capabilities) for at least a selected minimum period of time (again, a day, a week, or a month, for example).

FIG. 11 illustrates yet another embodiment of the CPU operation of the system when operating as an Uninterruptable Power Supply (UPS) with grid power only. Such a situation can arise in places where the grid is unstable and ready access to on-site renewable power in unavailable. In such a situation, the system reverts to the functionality of a traditional UPS.

In block [1110] the user inputs the operating hours of the system. This may be needed to conserve battery charge to times it is absolutely necessary. The system may default to 24 hours of UPS operation if no input is provided. In block [1112] it is checked if the system is within operating hours. If so it is checked in [1114] if grid power is available. If the check is successful then in block [1116] the system outputs grid power and the battery is charged with grid power until it is fully charged. If grid power is not available with operation hours then it is checked in block [1118] if battery has enough charge. If it is true then the output is powered by battery power until battery is completely discharged [1120]. However, if there is no battery charge either as checked in bock [1118] the system enters non-operation mode as there is nothing it can do further [1124]. If the system is outside the operation hours [1112] then it is checked in block [1122] to see if grid power is available. If it is true then output is powered by grid power in block [1126] and the battery is also charged for future operation. However, if grid power is unavailable then the system idles in non-operation mode is [1124]. This can happen even though there is enough charge in the battery as the system is outside its operation hours and battery charge is conserved. As before the operation situation of the system is reevaluated on a continuous basis to determine the most suitable course of action at any point of time. Thus, all action boxes loop back to the start node after block [1110] and the above process is repeated on a continuous basis.

FIG. 12 illustrates one embodiment of a CPU operation of the system in a completely off-grid situation where no electrical grid is available. In this case only on-site renewable energy generation will be used to power the output. It is checked if renewable power is available in block [1210]. If it is available it is determined whether the renewable power capacity exceeds the load in block [1212]. If so then the output is powered with the on-site renewable generation and the excess renewable power is used to charge the battery until it is fully charged in block [1214]. If the renewable is present but not adequate then it is checked if the battery has adequate charge in block [1216]. If so then the output load is powered by a mixture of renewable power and battery power in block [1218] until the battery is discharged. If battery is already discharged then the output is deactivated due to lack of adequate power and the battery is charged with whatever renewable power is available until it is ready to power the load [1220].

If there is no renewable power available in block [1210], then again a check is performed to see if there is adequate charge in the battery [1222]. If so then the load is powered from the battery only until it is fully discharged in [1224]. If the battery is already discharged then there is no power available and the system remains in non-operation mode [1226].

Sometimes an on-site fuel based generator may be available in addition to renewable generation. In such a situation the output of this generator can be connected to the grid input (or another input) of the system and the mode of operation may be shifted to the one in FIG. 8 as the cost of the generator electricity is usually higher than renewable electricity. As in previous operating modes, continuous monitoring of the external situation is performed and all action boxes loop back to the start node.

Figure 13:
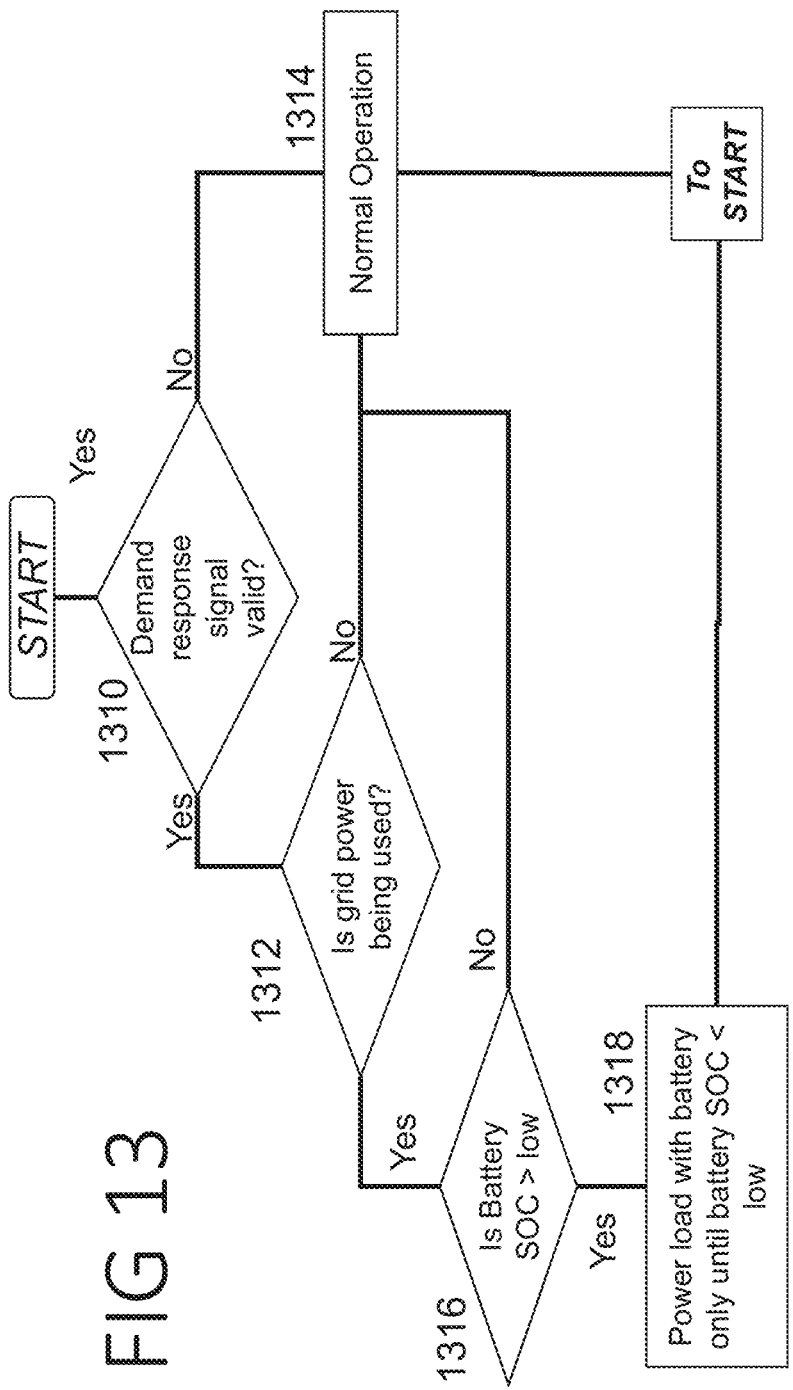
FIG. 13 illustrates one embodiment of a flow diagram of the system operation when a demand response signal has been received by the system from the utility that operates the grid.

FIG. 13 illustrates yet another embodiment of the CPU algorithm for the operation of the system when operating under demand-response mode. Demand response signals are sent by the utility operating the electrical grid to which the system is connected which is constantly being monitored [1310]. This is a signal to the system to start shaving load from the grid as the grid electricity demand is too high. This signal acts as an interrupt to the microcontroller in the CPU and it abandons its normal operation mode to enter this demand response mode. If the system is not using grid electricity as checked in [1312] then the system continues its normal operation [1314] which could be any of the modes described in FIG. 7 to FIG. 13. However, if it is using grid electricity at that time the battery is checked to see if it has enough charge to switch to battery power [1316]. If the battery does not have enough charge then the system cannot forego using grid electricity and continues using grid electricity to power the loads. However, if the battery has enough charge then the output of the system is switched to battery power [1318]. This mode of operation continues until the battery is discharged or the demand response interrupt is removed by the utility.

In several of the above examples, the discussion focuses on renewable sources of electricity (such as solar panels or wind turbines) and grid electricity. In further examples, in addition to the renewable sources there may also be portable sources such as a gas generator. Thus the inputs to a system as in FIG. 1 or FIG. 2 may include a first input that is a grid input, and one or more second inputs that are configured a non-grid inputs and may receive power from, for example, solar panels, wind turbines, fuel cells, and/or gas generators. An adaptor may be provided to couple to further potential sources, such as taking electricity from a vehicle by simply coupling to the vehicle battery while the vehicle is running, taking advantage (at least for temporary purposes) of the electricity generated by a vehicle alternator.

Accordingly, the present invention illustrates a programmable, intelligent, and reconfigurable system for storing and supplying electrical energy under various use cases that is versatile enough to operate in situations from stable electrical grid to unstable electrical grid to absolutely no electrical grid and also when on-site renewable generation is only source of electrical power to situations where there is no renewable generation available. All the while its objective is to minimize the cost of electrical energy used by the consumer as well as ensure the most stable electrical output to power user appliances. Although this invention is described in certain specific embodiments, many additional modifications and variations would be apparent to those skilled in the art. It is therefore understood that this invention may be practiced otherwise than specifically described. Thus, the present embodiments of the invention should be considered in all respect as illustrative and not restrictive. The scope of the invention is to be determined by the appended claims and their equivalence rather than the foregoing description.

The invention claimed is:

1. A hardware/software reconfigurable power supply management system comprising a base station comprising:
    a plurality of inputs for receiving electricity including at least one first input configured to receive grid power and at least one second input for receiving power from a non-grid source;
    at least one output for providing output electricity;
    a rechargeable battery for storing electrical power;
    at least one first converter for converting electricity received from at least one of the plurality of inputs for storage in the rechargeable battery;
    a second converter for converting electricity stored in the rechargeable battery for use at the at least one output;
    one or more relays interconnecting one or more of the plurality of inputs to the rechargeable battery and the at least one output;
    one or more sensors coupled to one or more of the plurality of inputs, the rechargeable battery, and the at least one output; and
    a port for receiving a central processing unit (CPU) for the base station, wherein the port facilitates removal and replacement of the CPU by a user and the port is configured to couple the CPU to each of:
    the one or more relays interconnecting one or more of the plurality of inputs to the rechargeable battery and the at least one output; and
    the one or more sensors coupled to one or more of the plurality of inputs, the rechargeable battery, and the at least one output;
    such that the CPU controls operations of each such component of the base station.

2. The system of claim 1 further comprising at least a first CPU and a second CPU, the first CPU including a microcontroller and the second CPU omitting a microcontroller.

3. The system of claim 1, further comprising at least a first CPU, the first CPU including a microcontroller.

4. The system of claim 1, further comprising at least a first CPU, the first CPU omitting a microcontroller.

5. The system of claim 1 further comprising:
    a first CPU adapted to monitor status of the rechargeable battery, power supply at the plurality of inputs, and demand at the at least one output, and manage power using only the rechargeable battery, power supply and demand statuses; and
    a second CPU adapted to monitor status of the rechargeable battery, power supply at the plurality of inputs, and demand at the at least one output, as well as at least one of historical use patterns, and time of day, and to manage power using the rechargeable battery, power supply and demand statuses in addition to at least one of historical use patterns and time of day.

6. The system of claim 1 further comprising:
a first CPU adapted to monitor status of the rechargeable battery, power supply at the plurality of inputs, and demand at the at least one output, and manage power using only the rechargeable battery, power supply and demand statuses; and
a second CPU adapted to monitor status of the rechargeable battery, power supply at the plurality of inputs, and demand at the at least one output, as well as to obtain data from at least one remote source related to at least one of grid power pricing and/or weather, and to manage power using the rechargeable battery, power supply and demand statuses in addition to data from the at least one remote source.

7. The system of claim 1 further comprising:
a first CPU adapted to monitor status of the rechargeable battery, power supply at the plurality of inputs, and demand at the at least one output, as well as at least one of historical use patterns, and time of day, and to manage power using the rechargeable battery, power supply and demand statuses in addition to at least one of historical use patterns and time of day; and
a second CPU adapted to monitor status of the rechargeable battery, power supply at the plurality of inputs, and demand at the at least one output, as well as to obtain data from at least one remote source related to at least one of grid power pricing and/or weather, and to manage power using the rechargeable battery, power supply and demand statuses in addition to data from the at least one remote source.

8. The system of claim 1 further comprising:
a first CPU adapted to monitor status of the rechargeable battery, power supply at the plurality of inputs, and demand at the at least one output, and manage power using only the rechargeable battery, power supply and demand statuses;
a second CPU adapted to monitor status of the rechargeable battery, power supply at the plurality of inputs, and demand at the at least one output, as well as at least one of historical use patterns, and time of day, and to manage power using the rechargeable battery, power supply and demand statuses in addition to at least one of historical use patterns and time of day; and
a third CPU adapted to monitor status of the rechargeable battery, power supply at the plurality of inputs, and demand at the at least one output, as well as to obtain data from at least one remote source related to at least one of grid power pricing and/or weather, and to manage power using the rechargeable battery, power supply and demand statuses in addition to data from the at least one remote source.

9. The system of claim 1 further comprising a CPU adapted to operate the system without a grid source.

10. The system of claim 1 further comprising a CPU adapted to operate the system with only a grid source.

11. The system of claim 1 wherein the at least one first converter for converting electricity received from at least one of the plurality of inputs for storage in the rechargeable battery comprises a converter configured to directly convert electricity received from at least one of the plurality of inputs directly into electricity for storage in the rechargeable battery.

12. The system of claim 1 further comprising a communication circuit for receiving a demand response signal from a utility, and further comprising a CPU responsive to the communication circuit to adapt power usage to preferentially switch from using grid power to using a renewable power source or the rechargeable battery.

13. The system of claim 1 further comprising a CPU adapted to perform in at least two modes, the two modes comprising an energy saver mode and an uninterruptible power supply mode.

14. The system of claim 1 further comprising a first CPU adapted to perform in an energy saver mode and a second CPU adapted to perform in an uninterruptible power supply mode.

15. A hardware/software reconfigurable power supply management system comprising a base station comprising:
a plurality of inputs for receiving electricity including at least one first input configured to receive grid power and at least one second input for receiving power from a non-grid source;
at least one output for providing output electricity;
a terminal for coupling to a rechargeable battery for storing electrical power;
at least one first converter for converting electricity received from at least one of the plurality of inputs for storage in a coupled rechargeable battery when a rechargeable battery is coupled to the terminal;
a second converter for converting electricity stored in the coupled rechargeable battery for use at the output when the coupled rechargeable battery is coupled to the terminal;
one or more relays interconnecting one or more of the plurality of inputs, the terminal, and the at least one output;
one or more sensors coupled to one or more of the plurality of inputs, the terminal, and the at least one output; and
a port for receiving a central processing unit (CPU) for the base station, wherein the port facilitates removal and replacement of the CPU by a user and the port is configured to couple the CPU to each of:
the one or more relays interconnecting one or more of the plurality of inputs, the terminal, and the at least one output; and
the one or more sensors coupled to one or more of the plurality of inputs, the terminal, and the at least one output;
such that the CPU controls operations of each such component of the base station.

16. The system of claim 15, further comprising at least a first CPU, the first CPU including a microcontroller.

17. The system of claim 15, further comprising at least a first CPU, the first CPU omitting a microcontroller.

18. The system of claim 15 further comprising a communication circuit for receiving a demand response signal from a utility, and further comprising a CPU responsive to the communication circuit to adapt power usage to preferentially switch from using grid power to using a renewable power source or the rechargeable battery.

19. The system of claim 15 further comprising a CPU adapted to perform in at least two modes, the two modes comprising an energy saver mode and an uninterruptible power supply mode.

* * * * *